US012581202B2

(12) United States Patent
Bailey

(10) Patent No.: US 12,581,202 B2
(45) Date of Patent: Mar. 17, 2026

(54) METHODS AND APPARATUSES FOR IMAGING UNDER PULSE-WIDTH MODULATED ILLUMINATION

(71) Applicant: Unify Medical, Inc., Cleveland, OH (US)

(72) Inventor: Arthur E Bailey, Vancouver (CA)

(73) Assignee: Unify Medical, Inc., Cleveland, OH (US)

( * ) Notice: Subject to any disclaimer, the term of this patent is extended or adjusted under 35 U.S.C. 154(b) by 0 days.

(21) Appl. No.: 19/246,452

(22) Filed: Jun. 23, 2025

(65) Prior Publication Data

US 2025/0392827 A1 Dec. 25, 2025

Related U.S. Application Data

(60) Provisional application No. 63/662,791, filed on Jun. 21, 2024, provisional application No. 63/795,827, filed on Apr. 28, 2025.

(51) Int. Cl.
*H04N 23/80* (2023.01)
*G02B 27/01* (2006.01)
(Continued)

(52) U.S. Cl.
CPC ......... *H04N 23/80* (2023.01); *G02B 27/0172* (2013.01); *H04N 13/167* (2018.05);
(Continued)

(58) Field of Classification Search
CPC .... H04N 23/80; H04N 13/167; H04N 13/344; H04N 23/55; H04N 23/60;
(Continued)

(56) References Cited

U.S. PATENT DOCUMENTS 6,771,305 B2 * 8/2004 Smith .................... H04N 23/70 348/E5.034
7,479,632 B1 * 1/2009 Gevelber ............ H01J 37/1475 250/311

(Continued)

OTHER PUBLICATIONS

International Search Report; U.S. Patent and Trademark Office; International Patent Application No. PCT/US2025/034835; Nov. 4, 2025; 3 pages.

(Continued)

*Primary Examiner* — Gevell V Selby
(74) *Attorney, Agent, or Firm* — Taft Stettinius & Hollister LLP

(57) ABSTRACT

A system for reducing artifacts when imaging under pulse-width modulated illumination. A controller captures, with an image sensor, images as frames of a video of a target in an environment in which the target is illuminated by a pulse-width modulated light source. In doing so, the controller sets a first parameter for the image sensor as a function of a light pulsation period of the pulse-width modulated light source to reduce artifacts in the images associated with the pulse-width modulation of the light source. Further, the controller determines whether residual banding artifacts resulting from the pulse-width modulation of the light source are unacceptable in the images captured with the image sensor. Additionally, the controller performs, in response to a determination that residual banding artifacts are present in the images, image processing to correct the residual banding. The system outputs the resulting images with reduced artifacts for viewing by a user.

27 Claims, 26 Drawing Sheets

(51) Int. Cl.

| | |
|---|---|
| ***H04N 13/167*** | (2018.01) |
| ***H04N 13/344*** | (2018.01) |
| ***H04N 23/55*** | (2023.01) |
| ***H04N 23/60*** | (2023.01) |

(52) U.S. Cl.
CPC ........... *H04N 13/344* (2018.05); *H04N 23/55* (2023.01); *H04N 23/60* (2023.01); *G02B 2027/0138* (2013.01); *G02B 2027/014* (2013.01); *G02B 2027/0178* (2013.01)

(58) Field of Classification Search
CPC ........ G02B 27/0172; G02B 2027/0138; G02B 2027/014; G02B 2027/0178
See application file for complete search history.

(56) References Cited

U.S. PATENT DOCUMENTS

| | | | | |
|---|---|---|---|---|
| 2007/0153094 | A1* | 7/2007 | Noyes .................. | H04N 23/745<br>348/E5.041 |
| 2014/0085534 | A1* | 3/2014 | Bergquist ............... | H04N 23/56<br>362/4 |
| 2017/0264836 | A1 | 9/2017 | Mandelli et al. | |
| 2018/0041681 | A1 | 2/2018 | Pope et al. | |
| 2022/0377217 | A1 | 11/2022 | Dehghani et al. | |

OTHER PUBLICATIONS

Written Opinion of the International Searching Authority; U.S. Patent and Trademark Office; International Patent Application No. PCT/US2025/034835; Nov. 4, 2025; 13 pages.

* cited by examiner

1100

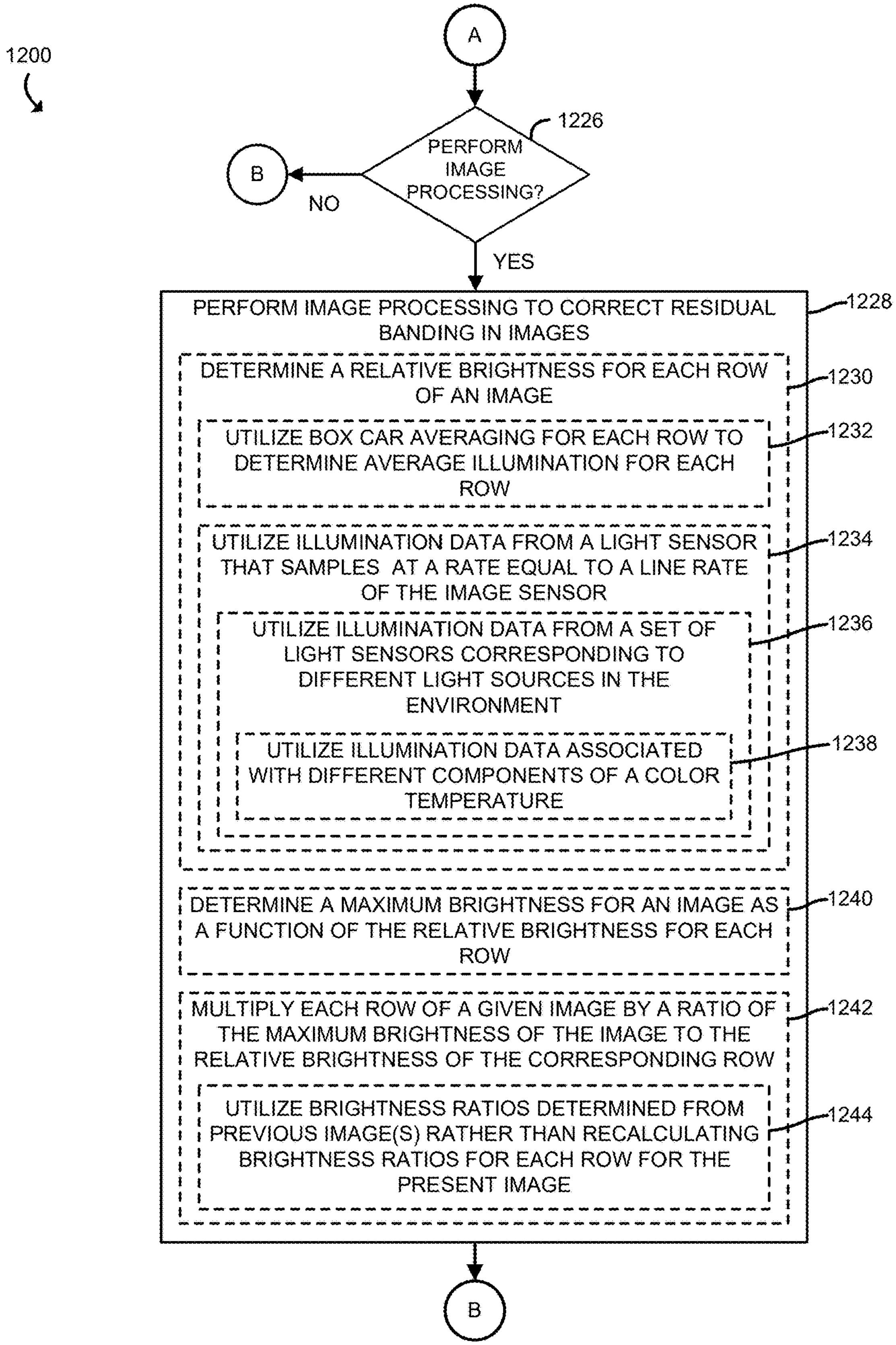

PERFORM IMAGE PROCESSING? ~1226

B   NO

YES

PERFORM IMAGE PROCESSING TO CORRECT RESIDUAL BANDING IN IMAGES ~1228

DETERMINE A RELATIVE BRIGHTNESS FOR EACH ROW OF AN IMAGE ~1230

UTILIZE BOX CAR AVERAGING FOR EACH ROW TO DETERMINE AVERAGE ILLUMINATION FOR EACH ROW ~1232

UTILIZE ILLUMINATION DATA FROM A LIGHT SENSOR THAT SAMPLES AT A RATE EQUAL TO A LINE RATE OF THE IMAGE SENSOR ~1234

UTILIZE ILLUMINATION DATA FROM A SET OF LIGHT SENSORS CORRESPONDING TO DIFFERENT LIGHT SOURCES IN THE ENVIRONMENT ~1236

UTILIZE ILLUMINATION DATA ASSOCIATED WITH DIFFERENT COMPONENTS OF A COLOR TEMPERATURE ~1238

DETERMINE A MAXIMUM BRIGHTNESS FOR AN IMAGE AS A FUNCTION OF THE RELATIVE BRIGHTNESS FOR EACH ROW ~1240

MULTIPLY EACH ROW OF A GIVEN IMAGE BY A RATIO OF THE MAXIMUM BRIGHTNESS OF THE IMAGE TO THE RELATIVE BRIGHTNESS OF THE CORRESPONDING ROW ~1242

UTILIZE BRIGHTNESS RATIOS DETERMINED FROM PREVIOUS IMAGE(S) RATHER THAN RECALCULATING BRIGHTNESS RATIOS FOR EACH ROW FOR THE PRESENT IMAGE ~1244

B

1500

1502

PERFORM FRAME RATE ADJUSTMENT TO ELIMINATE POSSIBILITY FOR STATIC DARK BANDS

1504

ADJUST ANALOG GAIN AND INTEGRATION TIME TO MINIMIZE OPTICAL BLACK AND OVERFLOW AND TO MAXIMIZE DYNAMIC RANGE

1506

PERFORM PER-LINE GAIN / OFFSET ADJUSTMENT

1600

PERFORM FRAME RATE ADJUSTMENT

1700

ADJUST SENSOR GAIN AND INTEGRATION TIME

1800

| GAIN (SENSOR) | GAIN (%) | GAIN DIFFERENCE |
|---|---|---|
| 16.00 | 100 | |
| 15.50 | 94 | 0.50 |
| 14.75 | 92 | 0.37 |
| 14.38 | 90 | 0.38 |
| 14.00 | 88 | 0.37 |
| 13.63 | 86 | 0.38 |
| 13.25 | 84 | 0.37 |
| 12.88 | 82 | 0.38 |
| 12.50 | 80 | 0.37 |
| 12.13 | 78 | 0.38 |
| 11.75 | 76 | 0.37 |
| 11.38 | 74 | 0.38 |
| 11.00 | 72 | 0.37 |
| 10.63 | 70 | 0.38 |
| 10.25 | 68 | 0.37 |
| 9.88 | 66 | 0.38 |
| 9.50 | 64 | 0.37 |
| 9.13 | 62 | 0.38 |
| 8.75 | 60 | 0.37 |
| 8.13 | 58 | 0.38 |
| 8.00 | 56 | 0.62 |
| 7.88 | 54 | 0.13 |
| 7.76 | 52 | 0.12 |
| 7.65 | 51 | 0.12 |
| 7.65 | 50 | 0.11 |

| GAIN (FLOAT) | GAIN (%) | GAIN DIFFERENCE |
|---|---|---|
| 7.53 | 49 | 0.12 |
| 7.44 | 48 | 0.09 |
| 7.33 | 47 | 0.11 |
| 7.22 | 46 | 0.11 |
| 7.11 | 45 | 0.11 |
| 7.05 | 44 | 0.06 |
| 6.84 | 43 | 0.21 |
| 6.74 | 42 | 0.10 |
| 6.60 | 41 | 0.14 |
| 6.40 | 40 | 0.20 |
| 6.10 | 39 | 0.30 |
| 5.82 | 38 | 0.28 |
| 5.57 | 37 | 0.25 |
| 5.33 | 36 | 0.24 |
| 5.12 | 35 | 0.21 |
| 4.92 | 34 | 0.20 |
| 4.74 | 33 | 0.18 |
| 4.57 | 32 | 0.17 |
| 4.41 | 31 | 0.16 |
| 4.27 | 30 | 0.14 |
| 4.13 | 29 | 0.14 |
| 4.00 | 28 | 0.13 |
| 3.94 | 27 | 0.06 |
| 3.82 | 26 | 0.12 |
| 3.76 | 25 | 0.06 |

| GAIN (FLOAT) | GAIN (%) | GAIN DIFFERENCE |
|---|---|---|
| 3.56 | 24 | 0.20 |
| 3.37 | 23 | 0.19 |
| 3.20 | 22 | 0.17 |
| 3.10 | 21 | 0.10 |
| 3.00 | 20 | 0.10 |
| 2.91 | 19 | 0.09 |
| 2.78 | 18 | 0.13 |
| 2.67 | 17 | 0.11 |
| 2.56 | 16 | 0.11 |
| 2.46 | 15 | 0.10 |
| 2.37 | 14 | 0,09 |
| 2.29 | 13 | 0.08 |
| 2.21 | 12 | 0.08 |
| 2.13 | 11 | 0.08 |
| 2.06 | 10 | 0.07 |
| 2.00 | 9 | 0.06 |
| 1.88 | 8 | 0.12 |
| 1.78 | 7 | 0.10 |
| 1.60 | 6 | 0.18 |
| 1.45 | 5 | 0.15 |
| 1.33 | 4 | 0.12 |
| 1.23 | 3 | 0.10 |
| 1.14 | 2 | 0.09 |
| 1.03 | 1 | 0.11 |
| 1.00 | 0 | 0.03 |

FIG. 18

PERFORM PER-LINE ADJUSTMENTS

2100

2102 — SENSE THE PARAMETERS OF THE PULSED LIGHT ILLUMINATION IN THE ENVIRONMENT

2104 — GENERATE A CONFIGURATION FOR THE IMAGE SENSOR BASED ON THE PARAMETERS OF THE PULSED LIGHT ILLUMINATION IN THE ENVIRONMENT

2106 — CAPTURE AN IMAGE USING AN IMAGE SENSOR AND A LENS, UNDER PREVIOUSLY GENERATED CONFIGURATION FOR THE IMAGE SENSOR

2108 — SEND THE IMAGE TO A CONTROLLER OR A COMPUTER

2110 — DISPLAY THE PROCESSED IMAGE TO THE USER

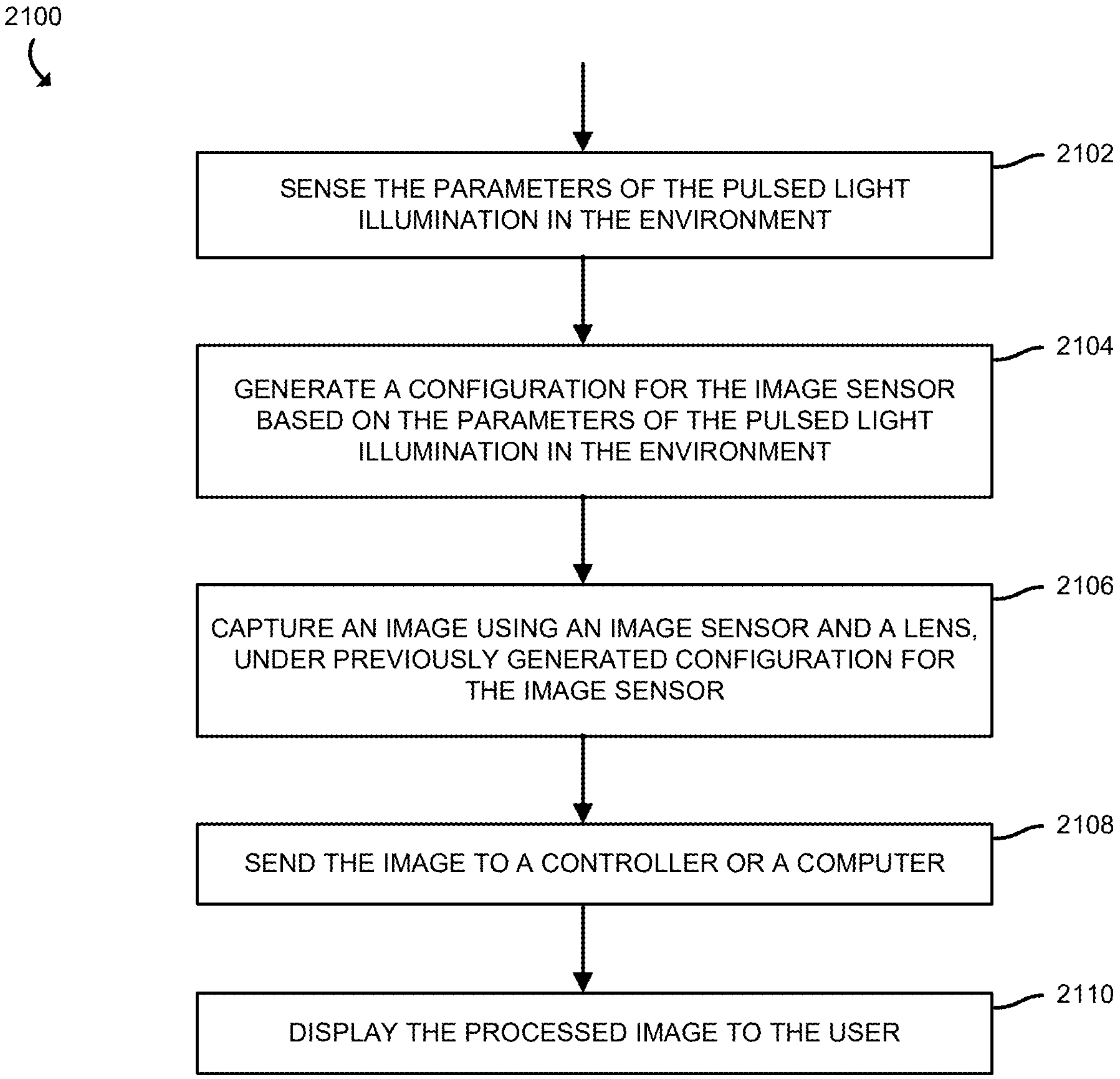

FIG. 21

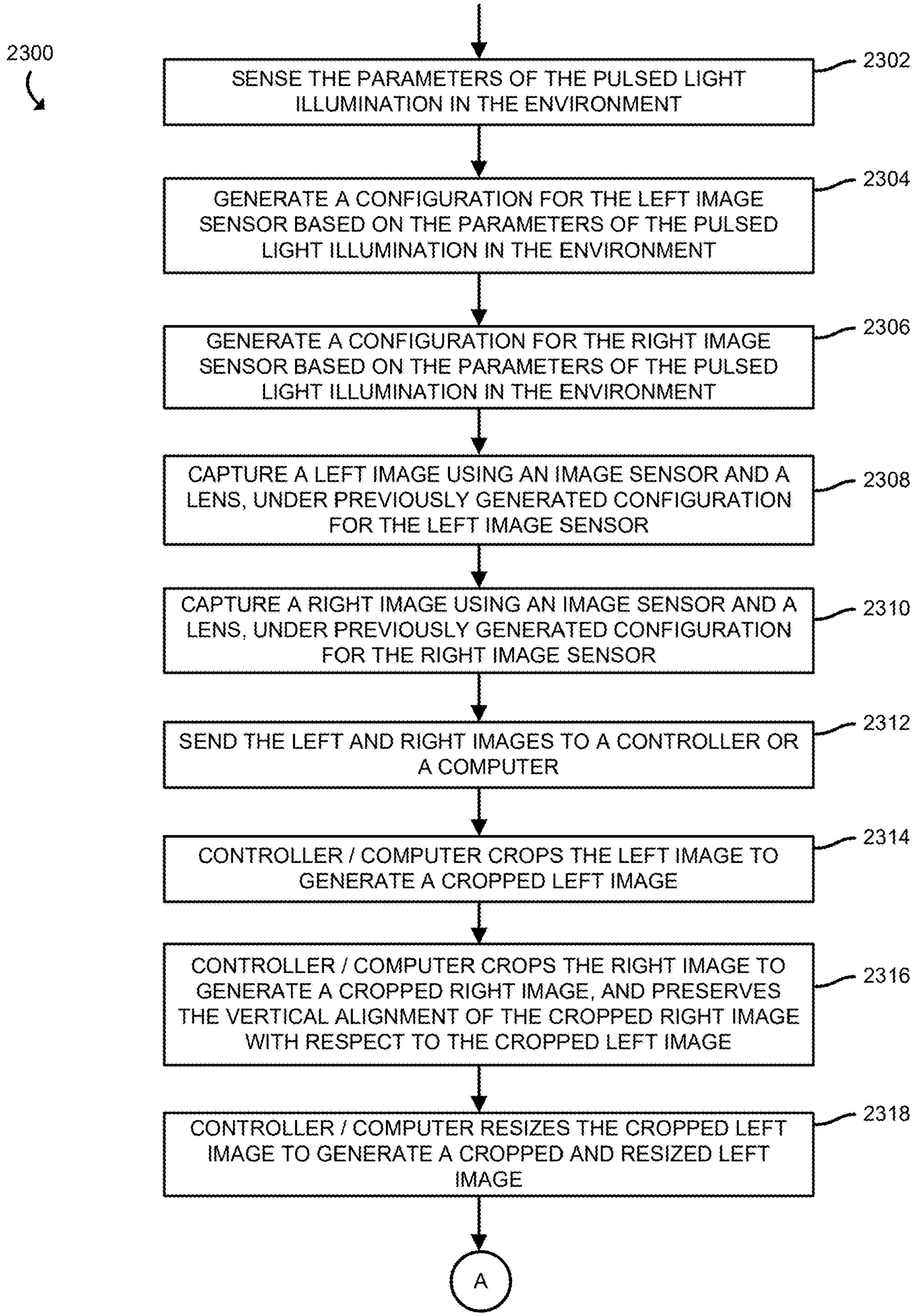

```
                    ┌──────────────────────────────────────────┐
                    │  SENSE THE PARAMETERS OF THE PULSED LIGHT │── 2302
                    │      ILLUMINATION IN THE ENVIRONMENT       │
                    └──────────────────────────────────────────┘
```

SENSE THE PARAMETERS OF THE PULSED LIGHT ILLUMINATION IN THE ENVIRONMENT — 2302

GENERATE A CONFIGURATION FOR THE LEFT IMAGE SENSOR BASED ON THE PARAMETERS OF THE PULSED LIGHT ILLUMINATION IN THE ENVIRONMENT — 2304

GENERATE A CONFIGURATION FOR THE RIGHT IMAGE SENSOR BASED ON THE PARAMETERS OF THE PULSED LIGHT ILLUMINATION IN THE ENVIRONMENT — 2306

CAPTURE A LEFT IMAGE USING AN IMAGE SENSOR AND A LENS, UNDER PREVIOUSLY GENERATED CONFIGURATION FOR THE LEFT IMAGE SENSOR — 2308

CAPTURE A RIGHT IMAGE USING AN IMAGE SENSOR AND A LENS, UNDER PREVIOUSLY GENERATED CONFIGURATION FOR THE RIGHT IMAGE SENSOR — 2310

SEND THE LEFT AND RIGHT IMAGES TO A CONTROLLER OR A COMPUTER — 2312

CONTROLLER / COMPUTER CROPS THE LEFT IMAGE TO GENERATE A CROPPED LEFT IMAGE — 2314

CONTROLLER / COMPUTER CROPS THE RIGHT IMAGE TO GENERATE A CROPPED RIGHT IMAGE, AND PRESERVES THE VERTICAL ALIGNMENT OF THE CROPPED RIGHT IMAGE WITH RESPECT TO THE CROPPED LEFT IMAGE — 2316

CONTROLLER / COMPUTER RESIZES THE CROPPED LEFT IMAGE TO GENERATE A CROPPED AND RESIZED LEFT IMAGE — 2318

( A )

2500

SENSE THE PARAMETERS OF THE PULSED LIGHT ILLUMINATION IN THE ENVIRONMENT ⟋ 2502

GENERATE A CONFIGURATION FOR THE LEFT IMAGE SENSOR BASED ON THE PARAMETERS OF THE PULSED LIGHT ILLUMINATION IN THE ENVIRONMENT ⟋ 2504

GENERATE A CONFIGURATION FOR THE RIGHT IMAGE SENSOR BASED ON THE PARAMETERS OF THE PULSED LIGHT ILLUMINATION IN THE ENVIRONMENT ⟋ 2506

CAPTURE A LEFT IMAGE USING AN IMAGE SENSOR AND A LENS, UNDER PREVIOUSLY GENERATED CONFIGURATION FOR THE LEFT IMAGE SENSOR ⟋ 2508

CAPTURE A RIGHT IMAGE USING AN IMAGE SENSOR AND A LENS, UNDER PREVIOUSLY GENERATED CONFIGURATION FOR THE RIGHT IMAGE SENSOR ⟋ 2510

SEND THE LEFT AND RIGHT IMAGES TO A CONTROLLER OR A COMPUTER ⟋ 2512

CONTROLLER/COMPUTER PROCESS THE LEFT IMAGE TO GENERATE A PROCESSED LEFT IMAGE, WHICH FURTHER REDUCES THE ARTIFACTS CAUSED BY THE PULSED LIGHT ILLUMINATION IN THE ENVIRONMENT ⟋ 2514

CONTROLLER/COMPUTER PROCESS THE RIGHT IMAGE TO GENERATE A PROCESSED RIGHT IMAGE, WHICH FURTHER REDUCES THE ARTIFACTS CAUSED BY THE PULSED LIGHT ILLUMINATION IN THE ENVIRONMENT ⟋ 2516

CONTROLLER/COMPUTER CROPS THE PROCESSED LEFT IMAGE TO GENERATE A CROPPED LEFT IMAGE ⟋ 2518

( A )

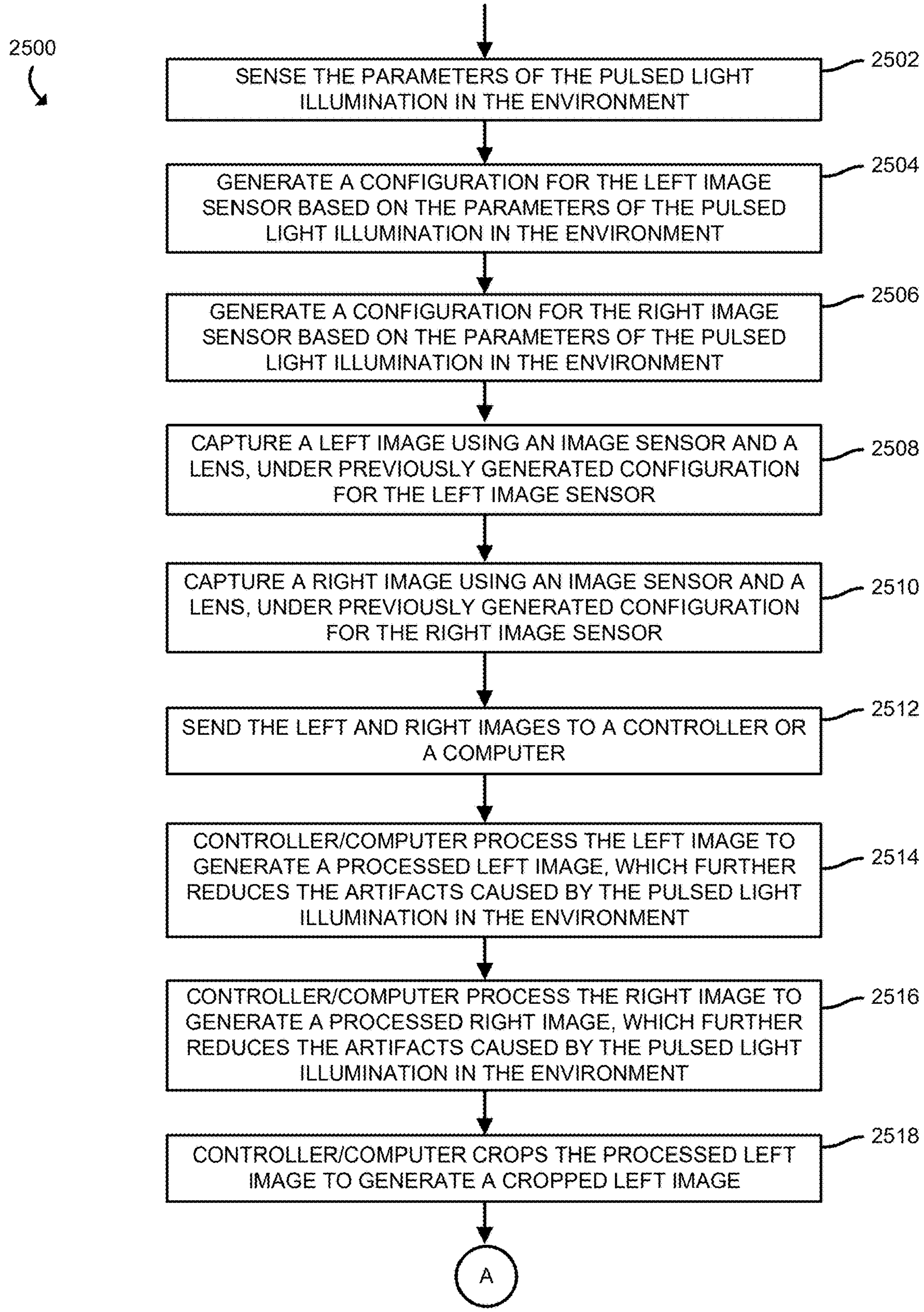

CONTROLLER/COMPUTER CROPS THE PROCESSED RIGHT IMAGE TO GENERATE A CROPPED RIGHT IMAGE, AND PRESERVES THE VERTICAL ALIGNMENT OF CROPPED RIGHT IMAGE WITH RESPECT TO THE CROPPED LEFT IMAGE ⟋ 2520

CONTROLLER/COMPUTER RESIZES THE CROPPED LEFT IMAGE TO GENERATE A CROPPED AND RESIZED LEFT IMAGE ⟋ 2522

CONTROLLER/COMPUTER RESIZES THE CROPPED RIGHT IMAGE TO GENERATE A CROPPED AND RESIZED RIGHT IMAGE ⟋ 2524

DISPLAY THE CROPPED AND RESIZED LEFT IMAGE TO THE LEFT EYE OF THE USER USING NEAR EYE 3D DISPLAY WORN BY THE USER ⟋ 2526

DISPLAY THE CROPPED AND RESIZED RIGHT IMAGE TO THE RIGHT EYE OF THE USER USING NEAR EYE 3D DISPLAY WORN BY THE USER ⟋ 2528

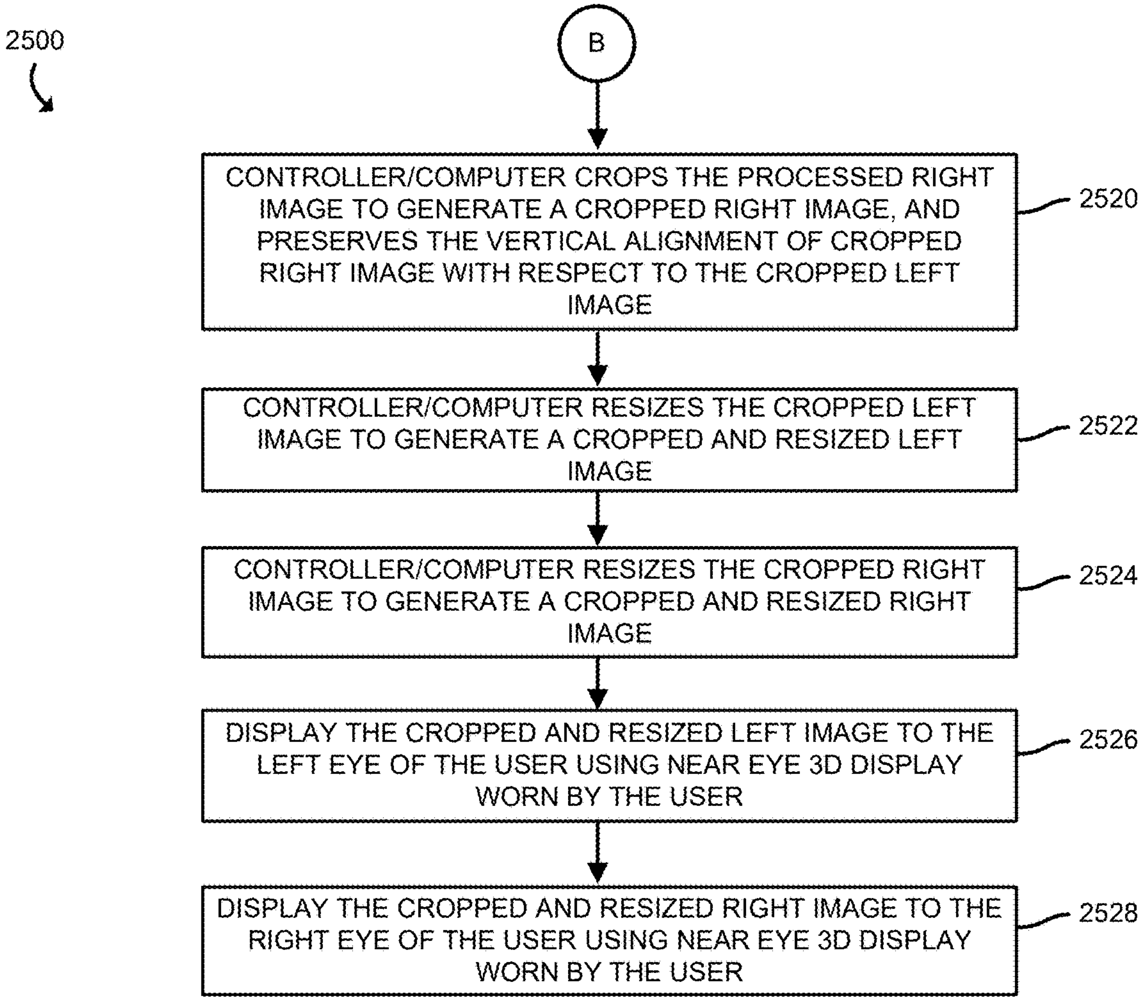

FIG. 26

METHODS AND APPARATUSES FOR IMAGING UNDER PULSE-WIDTH MODULATED ILLUMINATION

CROSS-REFERENCE TO RELATED APPLICATION

This application claims priority to and the benefit of U.S. Provisional Application No. 63/662,791 titled "METHODS AND APPARATUSES FOR IMAGING UNDER PULSE-WIDTH MODULATED ILLUMINATION," filed on Jun. 21, 2024 and U.S. Provisional Application No. 63/795,827 titled "METHODS AND APPARATUSES FOR IMAGING UNDER PULSE-WIDTH MODULATED ILLUMINATION," filed on Apr. 28, 2025, the contents of which are incorporated herein by reference in their entirety.

BACKGROUND

Technical Field

The present invention generally relates to imaging, image processing and visualization. Particularly, the present invention relates to methods and apparatuses that can be applied to surgical imaging under pulse-width modulated illumination.

Related Art

In a medical environment, such as an operating room, healthcare providers may utilize a surgical boom that is equipped with one or more light sources to illuminate a patient undergoing a medical procedure, such as a surgery. Modem surgical booms utilize one or more light emitting diodes (LEDs) as the light sources. Each LED pulses light at a frequency according to a pulse-width modulation scheme. Unlike light sources used in homes, which are typically designed operate at a relatively low frequency of 50 or 60 Hz, the light sources in surgical booms may operate in a much larger range of possible frequencies, from approximately 200 Hz to 1.6 GHz, depending on the manufacturer.

While the light pulsations from a pulse-width modulated light source are typically not noticeable by the human eye, the pulsations may cause visual artifacts, such as banding, in images produced by electronic image sensors. Image sensors may be preconfigured to operate under the known, relatively narrow range of frequencies used by conventional household LEDs to reduce or eliminate such visual artifacts. However, given the widely varying frequencies of pulse-width modulated light sources in other environments, such as the light sources in surgical booms, electronic image sensors and particularly those that utilize rolling shutters, are prone to producing images with visual artifacts that result from a lack of synchronization with the unknown and sometimes varying frequencies of those pulse-width modulated light sources.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

FIGS. 12-14 are flowcharts of a method that may be performed by the image capture device of FIG. 1 to reduce visual artifacts when imaging under pulse-width modulated illumination;

FIG. 18 depicts a chart of a gain lookup table (LUT) that may be utilized by the image capture device in accordance with the method of FIG. 15;

FIGS. 21-26 are flowcharts of methods that may be performed by embodiments of the image capture device in association with reducing visual artifacts when imaging under pulse with modulated illumination.

DETAILED DESCRIPTION OF THE PRESENT DISCLOSURE

Figure 1:
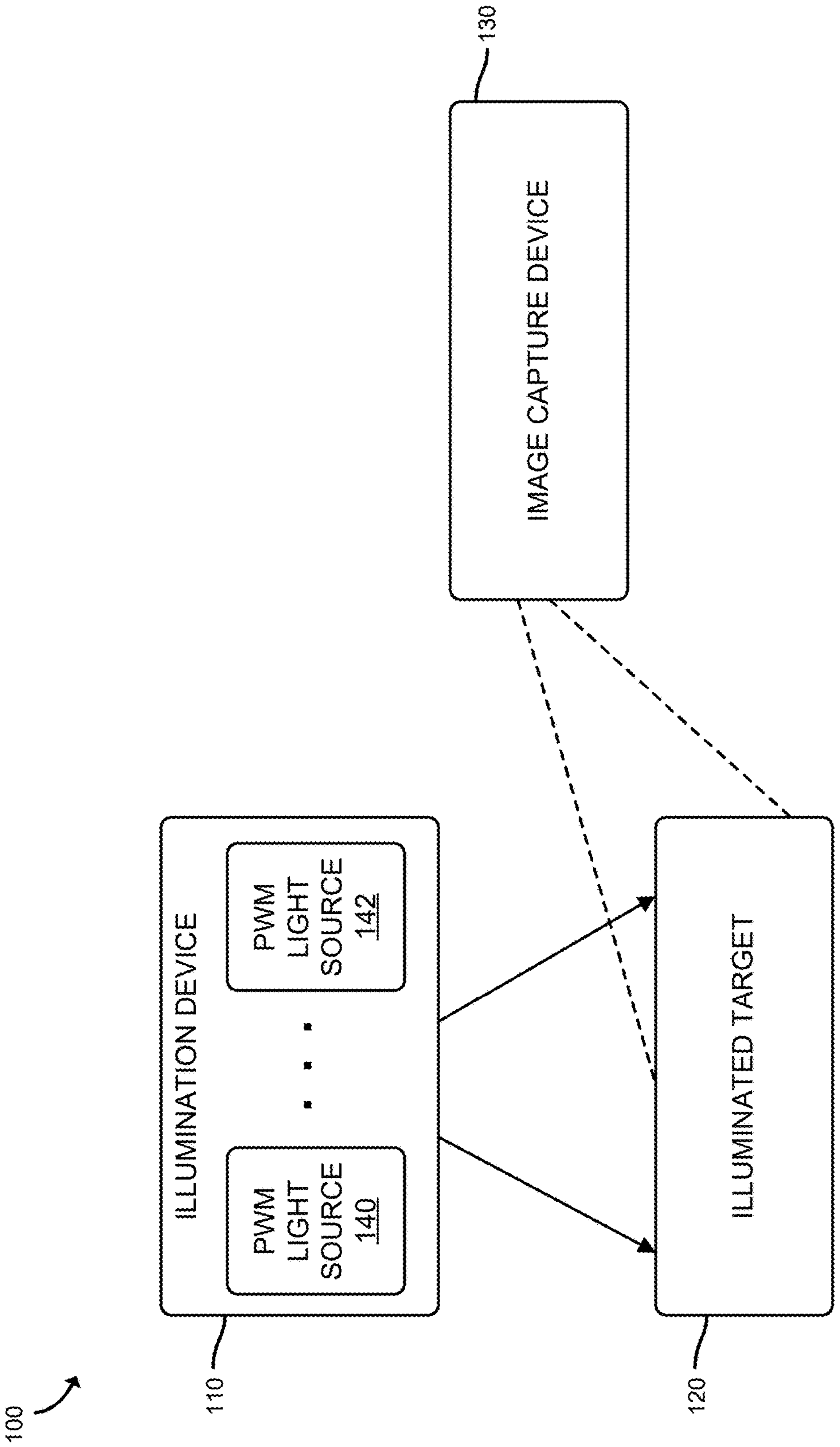
FIG. 1 illustrates an environment in which an illumination device that utilizes pulse-width modulation illuminates a target and an image capture device captures images of the illuminated target.

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

FIG. 1 illustrates an environment 100 in which an illumination device 110 illuminates a target 120 using pulse-width modulated light sources 140, 142. In the illustrative embodiment, the illumination device 110 may be a surgical boom and each pulse-width modulated light source 140, 142 may be a light emitting diode (LED). The light sources 140, 142 may emit light of different colors, operate at different frequencies, or may have different duty cycles (e.g., periods of time in which the light source is emitting light, also referred to herein as light pulsation periods or light periods). The light from the pulse-width modulated light sources 140, 142 may combine to produce a resulting color temperature. In the illustrative embodiment, the illuminated target 120 may be a human subject on which a medical procedure is performed. The image capture device 130 (also referred to herein as the "image capture system"), may be any device configured to capture images of the target 120 illuminated by the light produced from the pulse-width modulated light sources 140, 142 of the illumination device 110. In the illustrative embodiment, the image capture device 130 may be a wearable device, such as a wearable microscope, smart eyeglasses, a surgical visualization device, a virtual reality or augmented reality headset, or digital surgical loupes, capable of displaying images of the environment 100, and particularly, of the illuminated target 120, as a user of the image capture device (e.g., a surgeon wearing the image capture device 130) performs an operation.

As a wearable device, the viewing angle and associated level of light directed to the image capture device 130 may change significantly as the user (e.g., surgeon) articulates his or her neck, looks away from the illuminated target 120 momentarily, or otherwise moves in the environment 100. As such, in operation, the image capture device 130 selectively applies gain to compensate for momentary changes in brightness to present video frames (e.g., sequential images) of consistent brightness to the user. Further, the image capture device 130 may provide digital magnification of the images presented to the user to increase the visibility of particular portion of the illuminated target 120 during the surgical procedure. Furthermore, as a wearable device, the image capture device 130 may capture and display a stereoscopic, three dimensional view of the environment 100 by utilizing side-by-side image sensors corresponding to the left and right eyes of the user.

It should be appreciated that the image capture device 130 may not be a wearable device and it may be mounted onto a mechanical arm, a robotic arm, a stand, or integrated into other systems such as diagnostic or treatment medical systems. In one aspect, device 130 may be a part of a surgical robot. In another example, the image capture device 130 may be part of a system for non-medical applications, such as imaging systems for automobile, industrial, avionics, robotics, enterprise, consumer or any other suitable applications.

In operation, the light sources 140, 142 emit light according to a pulse-width modulation scheme that operates at a frequency that is unknown to the image capture device 130. As a result, a rolling shutter associated with each image sensor of the image capture device 130 may be out of synchronization with the pulse-width modulation scheme of the light sources 140, 142. Due to the lack of synchronization, visual artifacts, such as banding, may appear in the resulting images. As described in more detail herein, the image capture device 130, in operation, performs one or a plurality of operations to reduce or eliminate such visual artifacts to present a consistent, high quality view of the illuminated target 120 to the user.

Figure 2:
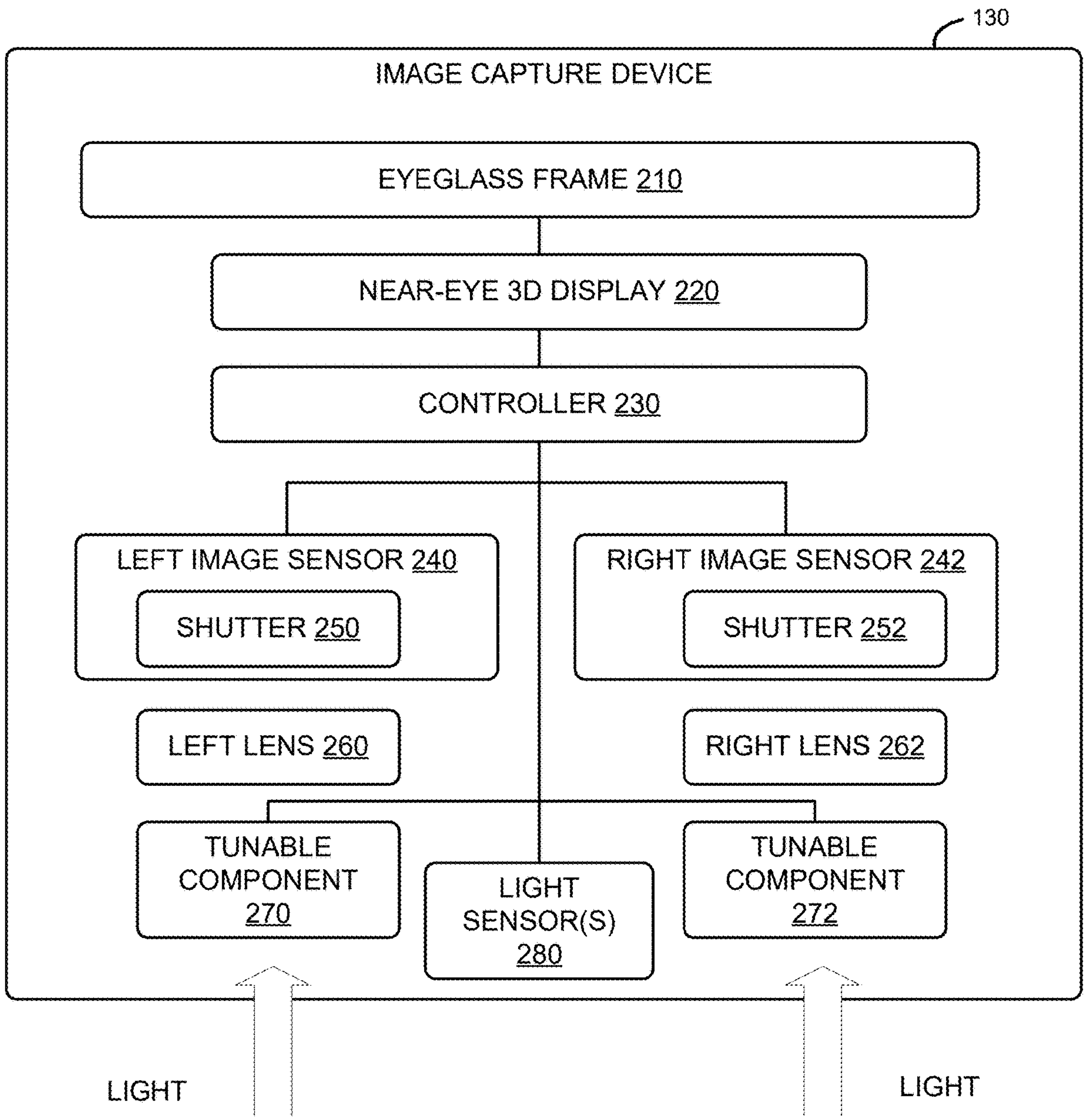
FIG. 2 illustrates a block diagram of at least one embodiment of the image capture device of FIG. 1.

FIG. 2 illustrates a block diagram of an embodiment of the image capture device 130 in a two imaging sensor configuration. The image capture device 130 comprises a left lens 260, a right lens 262, a left image sensor 240, a right image sensor 242, a controller 230, a near-eye 3D digital display 220, and an eyeglass frame 210. In one embodiment, the eyeglass frame 210 is a head mount. In another embodiment, the eyeglass frame 210 is a traditional eyeglass frame shaped to rest on the nose and ears of a user.

In operation, a first image sensor (such as the left image sensor 240) may capture a first image at an original size of the target. A second image sensor (such as the right image sensor 242) may be positioned on a common x-axis with the first image sensor 240 to capture a second image at the original size of the target. It should be appreciated that the first image sensor 240 and the second image sensor 242 may be positioned with either a converging angle or a diverging angle. It should also be appreciated that the first image sensor 240 and the second image sensor 242 may or may not be positioned on any common axis.

A controller 230 may execute image processing operations on images captured by the images sensors 240, 242. For example, to enable digital magnification, the controller 230 may obtain the first image captured by the first image sensor 240 at the original size of the target and on the second image captured by the second image sensor 242 at the original size of the target. The controller 230 may crop the first image captured by the first image sensor 240 and the second image captured by the second image sensor 242 to overlap a first portion of the target captured by the first image sensor 240 with a second portion of the target captured by the second image sensor 242. That is, the controller 230 may cause the first portion of the target captured by the first image sensor 240 to overlap with the second portion of the target captured by the second image sensor 242. In one aspect, the first image sensor 240 is further coupled with a first autofocus lens and the second image sensor 242 is further coupled with a second autofocus lens. The autofocus lenses may enable autofocus.

The controller 230 may adjust the cropping of the first image and the second image to provide binocular overlap of the first portion of the target with the second portion of the target. The binocular overlap of the first image and the second image is an overlap threshold that when satisfied results in a 3D image of the target displayed to a user after the digital magnification is executed. The controller may instruct a display (such as near-eye 3D display 220) to display the cropped first image and the cropped second image that includes the binocular overlap to the user. The displayed cropped first image and the cropped second image display the 3D image at the digital magnification to the user.

The controller 230 may resize the cropped first image to the original size of the first image captured by the first image sensor 240 and the cropped second image to the original size of the second image captured by the second image sensor 242. The cropped first image as resized and the cropped second image resized includes the binocular overlap of the first image and the second image. The controller 230 may instruct the near-eye 3D display 220 to display the resized and cropped first image and the resized and cropped second image that includes the binocular overlap to the user. The displayed resized and cropped first image and the resized and cropped second image display the 3D image at the digital magnification to the user. It should be appreciated that in one embodiment the controller 230 may crop the first image captured by the first image sensor 240, to generate both the left cropped image and right cropped image. In this embodiment, the second image captured by the second image sensor 242 is not used.

In one aspect, the display 220 is a near-eye display. In one embodiment, the display 220 is a 2D display. In another embodiment, the display 220 is a 3D display. It should be further appreciated that the near-eye display 220 may comprise LCD (liquid crystal) microdisplays, LED (light emitting diode) microdisplays, organic LED (OLED) microdisplays, liquid crystal on silicon (LCOS) microdisplays, retinal scanning displays, virtual retinal displays, optical see-through displays, video see-through displays, convertible video-optical see-through displays, wearable projection displays, projection displays, and the like. It should be the appreciated that the display 220 may be stereoscopic to enable displaying of 3D content. In another embodiment, the display 220 is a projection display. It should be appreciated that the display 220 may be a monitor placed near the user.

It should be further appreciated that the display 220 may be a 3D monitor placed near the user and the user will wear a polarizing glass or active shutter glasses. It should be further appreciated that the display 220 may be a half transparent mirror placed near the user to reflect the image projected by a projector. It should further be appreciated that the projector may be 2D or 3D. It should be further appreciated that the said projector may be used with the user wearing a polarizing glass or active shutter glasses. In one embodiment, the display 220 is a flat panel 2D monitor or TV. In another embodiment, the display 220 is a flat panel 3D monitor or 3D TV. The 3D monitor/TV may need to work with passive polarizers or active shutter glasses. In one aspect, the 3D monitor/TV is glass-free. It should be appreciated that the display 220 can be a touchscreen, or a projector. In one example, the display 220 comprises a half transparent mirror that can reflect projection of images to the eyes of the user. The images being projected may be 3D, and the user may wear 3D glasses (e.g. polarizer; active shutter 3D glasses) to visualize the 3D image data reflected by the half transparent mirror. The half transparent mirror may be placed on top of a surgical field to allow the user to see through the half transparent mirror to visualize the surgical field.

It should be appreciated that the binocular overlap of the system may be set as high as 100% or as low as 0%, depending on the specific application. In one aspect, the binocular overlap is set to be within the range of 60% and 100%. In another aspect, the binocular overlap is dynamic and not static.

As indicated in the configuration of FIG. 2, each image sensor 240, 242 is associated with a corresponding shutter 250, 252. Each shutter 250, 252 controls the amount of light that reaches the image sensor 240, 242, which in turn, affects exposure time (also referred to as integration time) and brightness of the resulting image. In the illustrative embodiment, each shutter 250, 252 is a rolling shutter, which operates to expose each pixel row (also referred to as a line) at a different time, as described in more detail herein with respect to timing charts. Unlike global shutters, which enable the exposure time to start and stop simultaneously for all lines (e.g., pixel rows of the corresponding image), rolling shutters provide higher pixel density, thereby enabling the digital magnification described above with smaller and less complex circuitry.

It should be appreciated that in one aspect the shutter 250, 252 may be global shutters. It should be appreciated that in one aspect the shutter 250, 252 may be mechanical shutters. It should be appreciated that in one aspect the shutter 250, 252 may be leaf shutters. It should be appreciated that in one aspect the shutter 250, 252 may be electronic shutters.

To further control the amount of light reaching the image sensors 240, 242, the image capture device 130 may further comprise tunable components 270, 272. The tunable components 270, 272 may be embodied as any devices that are capable of selectively increasing or decreasing the amount of light reaching a corresponding image sensor 240, 242 in response to a corresponding electronic signal from the controller 230. In some embodiments, each tunable component 270, 272 may include a motor-driven mechanical iris. In other embodiments, each tunable component 270, 272 may include a tunable cross polarizer device having a set of linear polarizers in which one of the linear polarizers is configured to rotate relative to another linear polarizer to selectively adjust the attenuation of light passing through the tunable cross polarizer device. In yet other embodiments, each tunable component 270, 272 may include a voltage-controlled liquid crystal filter that selective increases or decreases in opacity as a function of the voltage applied to the filter.

In at least some embodiments, the image capture device 130 may further comprise one or more light sensors 280. Each light sensor 280 may be embodied as a photoelectric device, such as a photodiode, configured to convert a received amount of light energy to a corresponding electrical signal. Each light sensor 280 may be synchronized to a line rate of the image sensors 240, 242 and provide, to the controller 230, data indicative of the amount of light sensed in the environment 100. As described in more detail herein, the controller 230 may utilize such information in the reduction or elimination of visual artifacts caused by the pulse-width modulated light emitted from the illumination device 110.

In some embodiments, the image capture device 130 may comprise additional sensors or components. In one embodiment, the image capture device 130 may further comprise a microphone, which may enable audio recording and/or communication. In one embodiment, the image capture device 130 may further comprise a proximity sensor, which may sense if the user is wearing the image capture device 130. In another embodiment, the image capture device 130 may include an inertial measurement unit (IMU), one or more accelerometers, gyroscopes, magnetometers, or a combination thereof. Additionally or alternatively, the image capture device 130 may comprise a loudspeaker or earphone, which may enable audio replay or communication.

It should be further appreciated that the system can be applied a variety of applications, including but not limited to surgical, medical, veterinary, military, tactical, educational, industrial, consumer, jewelry fields.

It should be further appreciated that the image capture device 130 may comprise only one image sensor. It should also be appreciated that the image capture device 130 may comprise only one image lens. Furthermore, the image capture device 130 may not comprise any tunable components, light sensors, shutters, eyeglass frames, or near-eye 3D displays.

Figure 3:
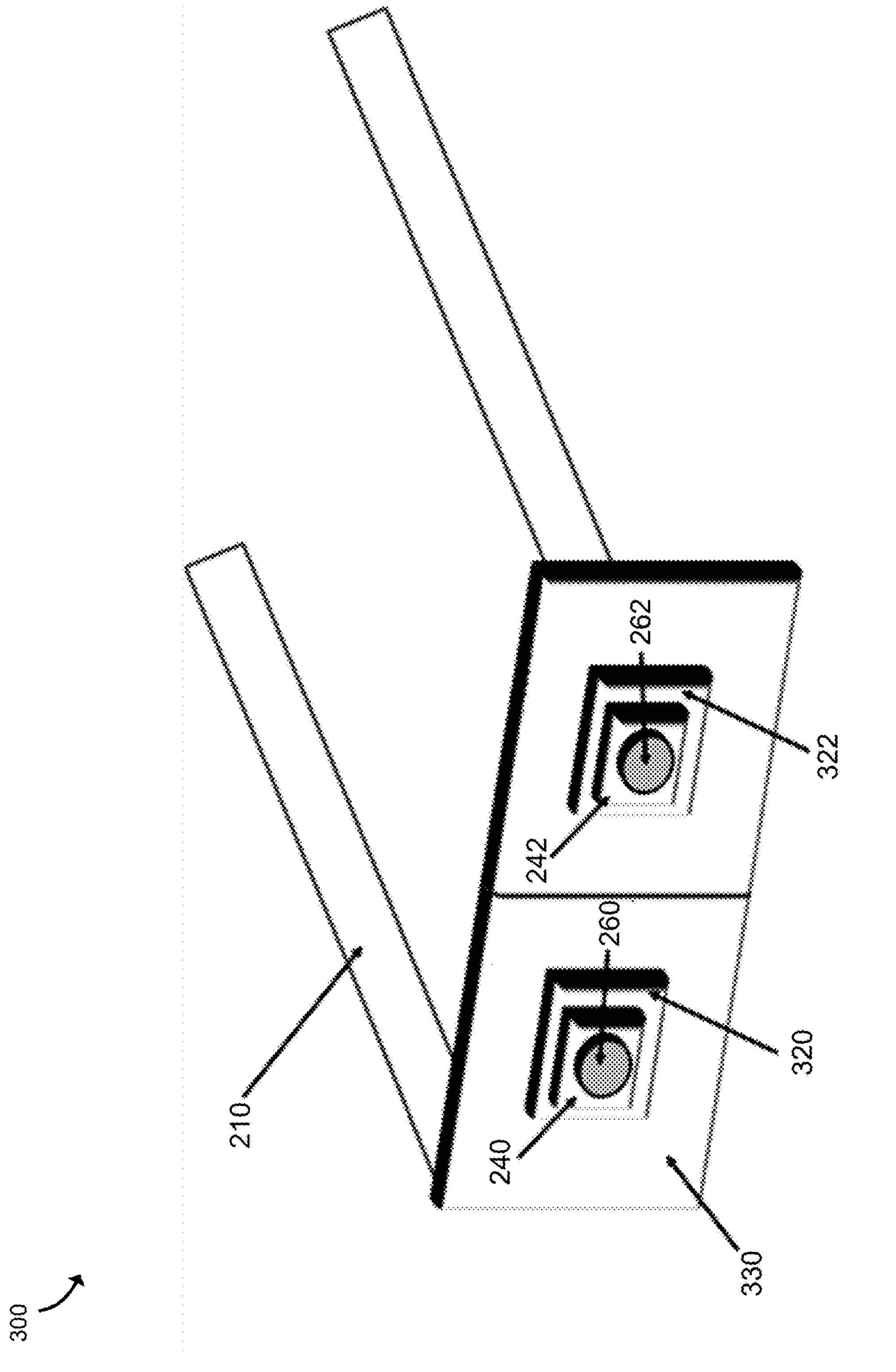
FIG. 3 illustrates a perspective view of an embodiment of the image capture device of FIG. 1 as a wearable device.
Figure 4:
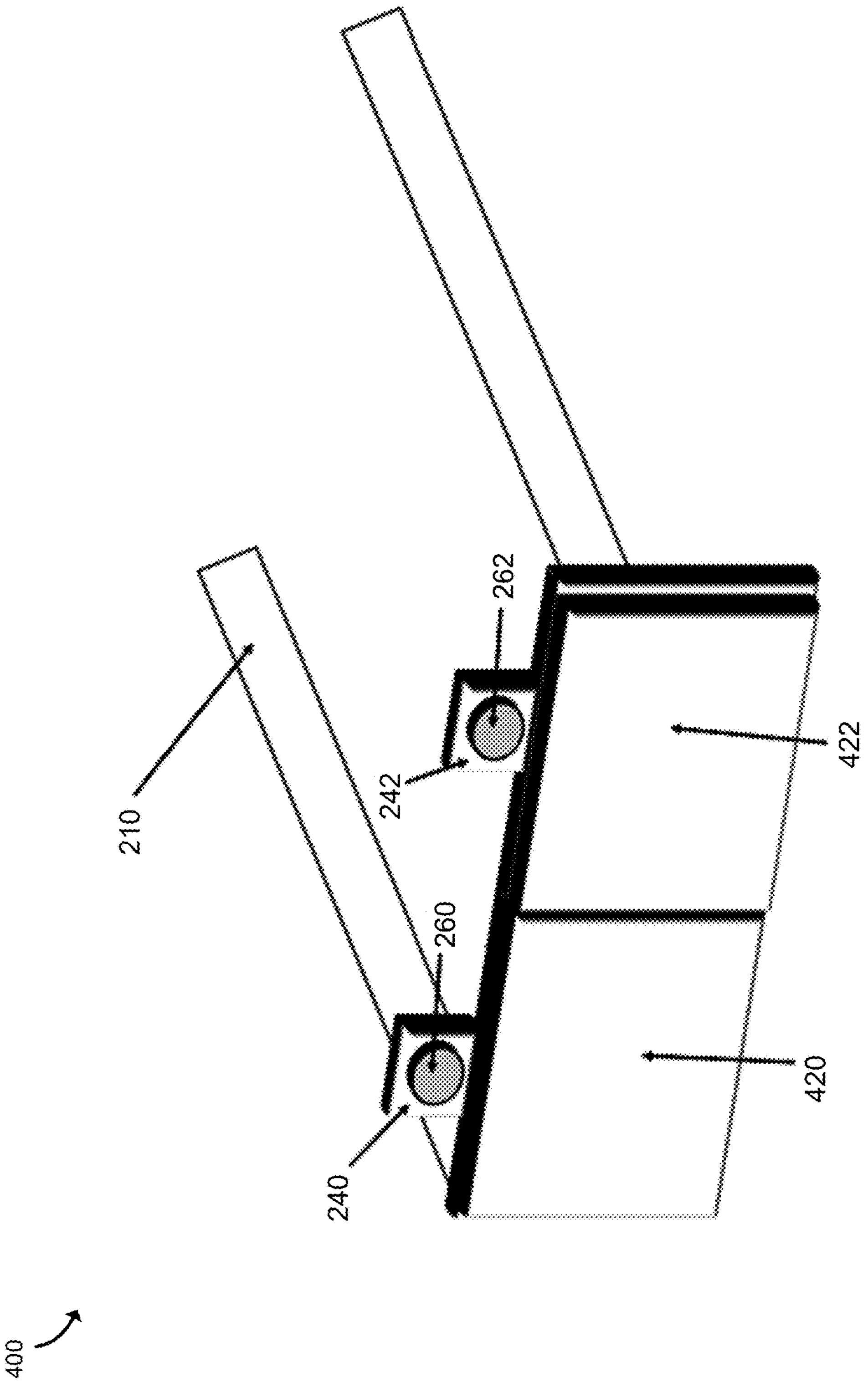
FIG. 4 illustrates a perspective view of another embodiment of the image capture device of FIG. 1 as a wearable device.

FIGS. 3 and 4 depict perspective views of physical embodiments 300, 400 of the image capture device 130. The wearable device configurations of the image capture device 130 include the left image sensor 240, the right image sensor 242, the left lens 260, the right lens 262, the left near-eye display 320, the right near-eye display 322, and an eyeglass frame 210. It should be appreciated that the wearable frame 210 may be in the form of a head mount, in lieu of an eyeglass frame. It should be appreciated that the controller 230 may be a microcontroller, a computer, a central processing unit (CPU), a graphics processing unit (GPU), Field Programmable Gate Arrays (FPGA), an application-specific integrated circuit (ASIC), or a combination thereof.

In one embodiment, the image capture device 130 may further include transparent material 330, such as transparent plastic or glass, surrounding the left near-eye display 320 and the right near-eye display 322. For example, the image capture device 130 may use a compact offset configuration, whereby only a part of area before each eye is non-transparent and the other parts are transparent. In one example, the center part of the area before each eye is non-transparent and the peripheral parts are transparent. This way, the user such as surgeon/dentist can see around the near-eye digital display to look at the patient with unhindered natural vision. In one embodiment, the image capture device 130 may further include prescription eyeglasses, so that nearsightedness, farsightedness, and astigmatism may be corrected.

In another embodiment, the image capture device 130 may include an optical see-through configuration. Referring to the embodiment in FIG. 4, the near-eye 3D displays 420, 422, similar to the near-eye 3D displays 320, 322, may both be transparent or semi-transparent. In one embodiment, the image sensors 240, 242 may be a pair of color image sensors. Thus, the image capture device 130 may digitally magnify stereoscopic color images and display to the user in the near-eye 3D display 320, 322, 420, 422 in 3D. In one example, the left and right lenses 260, 262 are lenses with fixed focal lengths. In another example, the left and right lenses 260, 262 are zoom lenses with variable focal lengths. In another example, the color image sensors 240, 242 may be complementary metal-oxide-semiconductor (CMOS) image sensors. In yet another example, the color image sensors 240, 242 may be charge-coupled device (CCD) image sensors. In one example, the left and right color image sensors are coupled with autofocus lenes to enable autofocus.

In one embodiment, only one image sensor is used. The image sensor will serve as both left image sensor 240 and right image sensor 242. In another embodiment, a 3D scanning unit comprising of a projector and an image sensor is used, similar to a 3D scanner. A 3D scan can be thus generated. The 3D scanning unit may use epipolar geometry for the 3D scan. By using different virtual viewpoints and projection angles, a virtual left image and virtual right image can be generated based on the 3D scan. The digital magnification process aforementioned may be applied to the virtual left image and virtual right image. The 3D scanning unit may use visible wavelengths, infrared wavelengths, ultraviolet wavelengths, or a combination thereof.

The aforementioned 3D scanning unit may project dynamic projection pattern to facilitate 3D scanning. A few examples of dynamic patterns are binary code, stripe boundary code, and miere pattern. In one embodiment, binary codeword is represented by a series of black and white stripes. If black represents 1 and white represents 0, the series of 0 and 1 at any given location may be encoded by the dynamic projection pattern; the binary dynamic projection pattern may be captured by the image sensor and lens, and decoded to recover the binary codeword that encodes an location (e.g. 10100011). In theory, N binary patterns may generate 2N different codewords per image dimension (x or y dimension). Similarly, binary coding may be extended to N-bits coding. For example, instead of binary case where only 1 and 0 are represented by black and white, a N-bits integer may be represented by an intensity in between. For instance, if it is a 2-bit encoding system, 2*2=4 different possibilities. If maximum intensity is I, 0, 1, 2, 3 can be represented by I, ⅔*I, ⅓*I, and 0, respectively. In other examples, dynamic stripe boundary code-based projection or the dynamic Moire code-based projection can be implemented.

In another embodiment, dynamic Fourier transform profilometry may be implemented by 3D scanning unit. In one aspect, periodical signals are generated to carry the frequency domain information including spatial frequency and phase. Inverse Fourier transform of only the fundamental frequency results in a principle phase value ranging from $-\pi$ to $\pi$. After spatial or temporal phase unwrapping (The process to remove $2\pi$ discontinuities and generate continuous map), actual 3D shape of patient anatomy may be recovered. Fourier transform profilometry is less sensitive to the effect of out-of-focus images of patients, making it a suitable technology for intraoperative 3D scanning. Similarly, $\pi$-shifted modified Fourier transform profilometry may be implemented intraoperatively, where a $\pi$-shifted pattern is added to enable the 3D scanning.

In another example, a DC image may be used with Fourier transform profilometry in the 3D scanning unit. By capturing the DC component, the DC-modified Fourier transform profilometry may improve 3D scan quality intraoperatively. In another example, N-step phase-shifting Fourier transform profilometry may be implemented intraoperatively. It should be appreciated that the larger the number of steps (N) is chosen, the higher the 3D scanning accuracy. For instance, three-step phase-shifting Fourier transform profilometry may be implemented to enable high speed 3D scanning intraoperatively. It should be appreciated that periodical patterns such as trapezoidal, sinusoidal, or triangular pattern may be used in the Fourier transform profilometry for intraoperative 3D scan. It should be further appreciated that windowed Fourier transform profilometry, two-dimensional Fourier transform profilometry, or wavelet Fourier transform profilometry may also be implemented by the aforementioned apparatuses and systems. It should be appreciated more than one frequency of periodical signal (e.g. dual frequencies) may be used in the modified Fourier transform profilometry, so that phase unwrapping becomes optional in the intraoperative 3D scan. The dynamic Fourier transform profilometry and modified Fourier transform profilometry may improve the quality of 3D scan of the patient. Improved 3D scans may enhance the image registration between intraoperative 3D scan and preoperative images (e.g. MRI and CT), thereby improving surgical navigation.

In yet another embodiment, the aforementioned 3D scanning unit implements Fourier transform profilometry or modified Fourier transform profilometry, in combination with binary codeword projection. The Fourier transform profilometry and binary codeword projection may be implemented sequentially, concurrently, or a combination thereof. The combined approach may improve the 3D scanning accuracy, albert at the cost of 3D scanning speed.

In another embodiment, the aforementioned projector may include at least one lens. The lens is configured such a way so that the projected pattern(s) are defocused. The defocusing process by the lens is similar a convolution of gaussian filter on the binary pattern. Consequently, the defocused binary pattern may create periodical patterns that are similar to sinusoidal patterns.

In another example, dithering techniques are used to generate high-quality periodical fringe patterns through binarizing a higher order bits fringe pattern (e.g. 8 bits) such as sinusoidal fringe patterns. In one example, ordered dithering is implemented; for example, a Bayer matrix can be used to enable ordered dithering. In another example, error-diffusion dithering is implemented; for instance, Floyd-Steinberg (FS) dithering or minimized average error dithering may be implemented. It should be appreciated that in some cases the dithering techniques may be implemented in combination with the defocusing technique to improve the quality of intraoperative 3D scan.

In another example, the aforementioned projector may generate a statistical pattern. For instance, the projector may generate a pseudo random pattern that includes a plurality of dots. Each position of each corresponding dot included in the pseudo random pattern may be pre-determined by the projector. The projector may project the pseudo random pattern onto the patient or target. Each position of each corresponding dot included in the pseudo random pattern is projected onto a corresponding position on the patient/target. The image sensor may capture a 2D intraoperative image of a plurality of object points associated with the patient/target, to calculate the 3D topography.

The controller 230 may associate each object point associated the patient that is captured by the image sensor with a corresponding dot included in the pseudo random pattern that is projected onto the patient/target by the projector based on the position of each corresponding dot as pre-determined by the projector. The controller 230 may convert the 2D image to the 3D scan of the patient/target based on the association of each object point to each position of each corresponding dot included in the pseudo random pattern as pre-determined by the projector. In one example, the projector may include one or more edge emitting laser, at least one collimating lens, and at least one diffractive optics element. The edge emitting laser and the diffractive optics element may be controlled by the controller 230 to generate patterns desirable for the specific 3D scanning applications.

In some embodiments, the image sensors 240, 242 are a pair of color image sensors. In another example, the image capture device 130 comprises a white light source. In one aspect, the light source comprises one or a plurality of LEDs.

In some embodiments, the image sensors 240, 242 are a pair of monochrome sensors. Further, the image capture device 130 may include a least one fluorescence emission filter. Thus, the image capture device 130 may digitally magnify stereoscopic fluorescence images and display to the user in the near-eye 3D display 220, 320, 322, 420, 422 in 3D. The image capture device 130 may also include a light source, which may include a laser light; a light emitting diode (LED); an incandescent light; a projector lamp; an arc-lamp, such as xenon, xenon mercury, or metal halide lamp; as well as coherent or in-coherent light sources. In one example, the light source comprises of one or a plurality of white LEDs with a low pass filter (e.g. 775 nm short pass filter) and one or a plurality of near infrared LEDs with a band pass filter (e.g. 830 nm band pass filter). In another example, the light source comprises of one or a plurality of white LEDs with a low pass filter (e.g. 775 nm short pass filter) and one or a plurality of near infrared LEDs with a long pass filter (e.g. 810 nm long pass filter). In one example, the light source can be controlled by sensors such as an inertial measurement unit to turn the light on and off.

In some embodiments, the image capture device 130 includes one or a plurality of color image sensors, one or a plurality of monochrome image sensors, one or a plurality of beamsplitters, and one or a plurality of narrow band filters. The monochrome image sensor, the color sensor and the beamsplitter may be optically aligned on each side (left vs right), so that the left color image is aligned with the left monochrome image, and the right color image is aligned with the right monochrome image. It should be appreciated that the beamsplitters can be cube beamsplitters, plate beamsplitters, Pellicle Beamsplitters, Dichroic Beamsplitters, or polarizing beamsplitters. It should be appreciated that the optical design can be in a folded configuration using mirrors.

In another example, the image capture device 130 includes a light source with an additional spectral filter. The image capture device 130 may be used to capture narrow band reflectance images or fluorescence images, and to digitally magnify the image and display to the user in 3D with desirable binocular overlap. For example, the light source may be a plurality of white LEDs and near infrared LEDs (770 nm), and the spectral filter can be a 800 nm short pass filter. In another embodiment, the apparatus further includes additional sensors, such as an inertial measurement unit (IMU), accelerometers, gyroscopes, magnetometers, proximity sensors, microphone, force sensors, ambient light sensors, etc. In one example, the light source can be controlled by sensors such as an inertial measurement unit to turn the light on and off. In another example, the image capture device 130 can be controlled by sensors such as an inertial measurement unit and/or proximity sensor to turn the image capture device 130 on and off. Some examples of types of proximity sensors are: Photoelectric, Inductive, Capacitive and Ultrasonic.

In one embodiment, the image capture device 130 further includes at least one microphone. The image capture device 130 may record audio data such as dictation. The image capture device 130 may capture the audio data using the microphone, perform voice recognition using the controller 230, and enable voice control of the image capture device 130. In one aspect, the voice control may include adjustment of the magnification levels (e.g. from 3× to 5×). In one example, a microphone array or multiple microphones are used, the image capture device 130 may triangulate the source of sound for multiple purposes such as noise cancellation, voice control of multiple devices in close proximity, etc.. The image capture device 130 may differentiate the one user from other users based on the triangulation of voice/audio signal. In yet another embodiment, the image capture device 130 further includes tracking hardware, such as optical tracking hardware, electromagnetic tracking hardware, etc. In yet another embodiment, the image capture device 130 further includes communication hardware, to enable wireless or wired communication such as such as Wi-fi, Bluetooth, cellular communication, Ethernet, LAN, wireless communication protocols compatible with operating rooms, infrared communication. The apparatus can thus stream the magnification data and/or the original image data captured by the image sensors to another apparatus, computer or mobile devices. In yet another embodiment, the lenses 260, 262 in the image capture device 130 include autofocus lenses.

In yet another embodiment, the lenses 260, 262 in the image capture device 130 are autofocus lenses but the image capture device 130 may focus the lenses, on request of the user. For example, upon user request via an input device or via voice control, the lenses will be focused on the demand of the user. Thus, the autofocus will not be activated unless demanded by the user, thus avoiding unwanted autofocus during surgical procedures. In one example, the focus setting of the left lens 260 and right lens 262 are always the same. For example, the settings for focusing left lens 260 and the settings for right lens 262 are set to be the same, to avoid left lens focusing on a focal plane different from the right plane. It should be appreciated that, in one aspect, the autofocus lenses may operate fully automatically without user input.

In yet another embodiment, the image capture device 130 further includes additional input devices, such as a foot pedal, a wired or a wireless remote control, one or more button, a touch screen, microphone with voice control, gesture control device such as Microsoft Kinect, etc. It should be appreciated that the controller can be useable or disposable. It should be appreciated that a sterile sheet or wrap may be placed around the input device. In yet another embodiment, the image capture device 130 may display medical images such as MRI (magnetic resonance image) image data, computed tomography (CT) image data, positron emission tomography (PET) image data, single-photon emission computed tomography (SPECT), PET/CT, SPECT/CT, PET/MRI, gamma scintigraphy, X-ray radiography, ultrasound, and the like. In yet other embodiments, the image capture device 130 may include digital storage hardware, to enable recording the magnification data, and/or the original image data from image sensors, and/or audio data, and/or other sensor data.

The controller 230 comprises the hardware and software necessary to implement the aforementioned methods. In one embodiment, the controller 230 involves a computer-readable medium comprising processor-executable instructions configured to implement one or more of the techniques presented herein. An example embodiment of a computer-readable medium or a computer-readable device comprises a computer-readable medium, such as a SSD, CD-R, DVD-R, flash drive, a platter of a hard disk drive, etc., on which is encoded computer-readable data. This computer-readable data, such as binary data comprising at least one of a zero or a one, in turn comprises a set of computer instructions configured to operate according to one or more of the principles set forth herein. In some embodiments, the set of computer instructions are configured to perform a method, such as at least some of the exemplary methods described herein, for example. In some embodiments, the set of computer instructions are configured to implement a system, such as at least some of the exemplary systems described herein, for example. Many such computer-readable media are devised by those of ordinary skill in the art that are configured to operate in accordance with the techniques presented herein.

The following discussion provides a brief, general description of a suitable computing environment to implement embodiments of one or more of the provisions set forth herein. Example computing devices include, but are not limited to, personal computers that may comprise a graphics processing unit (GPU), server computers, hand-held or laptop devices, mobile devices (such as mobile phones, Personal Digital Assistants (PDAs), media players, and the like), multiprocessor systems, consumer electronics, mini computers, mainframe computers, a microcontroller, a Field Programmable Gate Array (FPGA), an application-specific integrated circuit (ASIC), distributed computing environments that include any of the above systems or devices, and the like. In one aspect, the controller may use a heterogeneous computing configuration.

Although not required, embodiments are described in the general context of "computer readable instructions" being executed by one or more computing devices. Computer readable instructions may be distributed via computer readable media. Computer readable instructions may be implemented as program components, such as functions, objects, Application Programming Interfaces (APIs), data structures, and the like, that perform particular tasks or implement particular abstract data types. Typically, the functionality of the computer readable instructions may be combined or distributed as desired in various environments.

In one example, a system comprises a computing device configured to implement one or more embodiments provided herein. In one configuration, the computing device includes at least one processing unit and one memory unit. Depending on the exact configuration and type of computing device, the memory unit may be volatile (such as RAM, for example), non-volatile (such as ROM, flash memory, etc., for example) or some combination of the two. In other embodiments, the computing device may include additional features and/or functionality. For example, the computing device may also include additional storage (e.g., removable and/or non-removable) including, but not limited to, cloud storage, magnetic storage, optical storage, and the like. In one embodiment, computer readable instructions to implement one or more embodiments provided herein may be in the storage. The storage may also store other computer readable instructions to implement an operating system, an application program, and the like. Computer readable instructions may be loaded in the memory for execution by the processing unit, for example.

The term "computer readable media" as used herein includes computer storage media. Computer storage media includes volatile and nonvolatile, removable and non-removable media implemented in any method or technology for storage of information such as computer readable instructions or other data. Computer storage media includes, but is not limited to, RAM, ROM, EEPROM, flash memory or other memory technology, CD-ROM, Digital Versatile Disks (DVDs) or other optical storage, magnetic disk storage or other magnetic storage devices, or any other medium which can be used to store the desired information and which can be accessed by computing device.

The computing device may also include communication connection(s) that allows the computing device to communicate with other devices. Communication connection(s) may include, but is not limited to, a modem, a Network Interface Card (NIC), an integrated network interface, a radio frequency transmitter/receiver, an infrared port, a USB connection, or other interfaces for connecting computing device to other computing devices. Communication connection(s) may include a wired connection or a wireless connection. Communication connection(s) may transmit and/or receive communication media.

The computing device may include input device(s) such as keyboard, mouse, pen, voice input device, touch input device, infrared cameras, depth cameras, touchscreens, video input devices, and/or any other input device. Output device(s) such as one or more displays, speakers, printers, and/or any other output device may also be included in the computing device. Input device(s) and output device(s) may be connected to the computing device via a wired connection, wireless connection, or any combination thereof. In one embodiment, an input device or an output device from another computing device may be used as input device(s) or output device(s) for computing device.

Components of a computing device may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device may be interconnected by a network. For example, the memory may be comprised of multiple physical memory units located in different physical locations interconnected by a network.

Those skilled in the art will realize that storage devices utilized to store computer readable instructions may be distributed across a network. For example, a computing device accessible via a network may store computer readable instructions to implement one or more embodiments provided herein. Computing device may access another computing device and download a part or all of the computer readable instructions for execution. Alternatively, the first computing device may download pieces of the computer readable instructions, as needed, or some instructions may be executed at the first computing device and some at the second computing device.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Imaging Under Pulse-Width Modulated Illumination

As mentioned above, modern, LED-based boom lights or surgical lights installed in operating rooms are often modulated to control both light level and, in some cases, color temperature. Use of these lights with one or a plurality of rolling shutter sensors, such as the image sensors 240, 242 with shutters 250, 252, results in images with severe banding artifacts. Indeed, under relatively bright pulse-width modulated illumination, the resulting image has many nearly black bands. As such, the resulting image is not usable.

As briefly mentioned above, image sensors come in several major types. One type is a rolling shutter and the other type is global shutter. Global shutter image sensors expose all pixels simultaneously while rolling shutter image sensors expose lines, corresponding to rows of pixels, sequentially such that not all lines are being exposed at the same time. The aforementioned artifacts result from the combination of using rolling shutters with pulse-width modulated illumination. Rolling shutter image sensors typically start integrating the image light one line at a time, with each line slightly delayed from the previous line. At the end of the integration time of each line, the line is read out. When all lines are read, the frame restarts to create a subsequent image.

Figure 5:
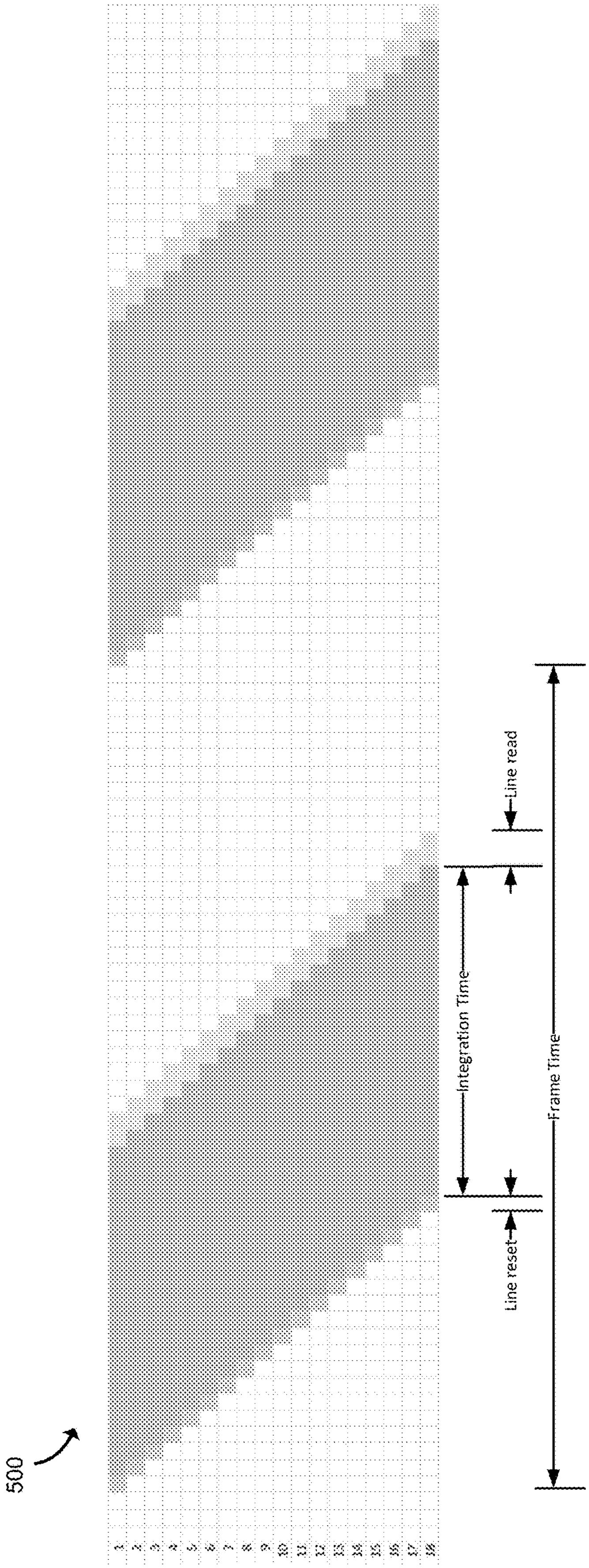
FIG. 5 depicts a diagram of rolling shutter sensor timing, including integration time.
Figure 6:
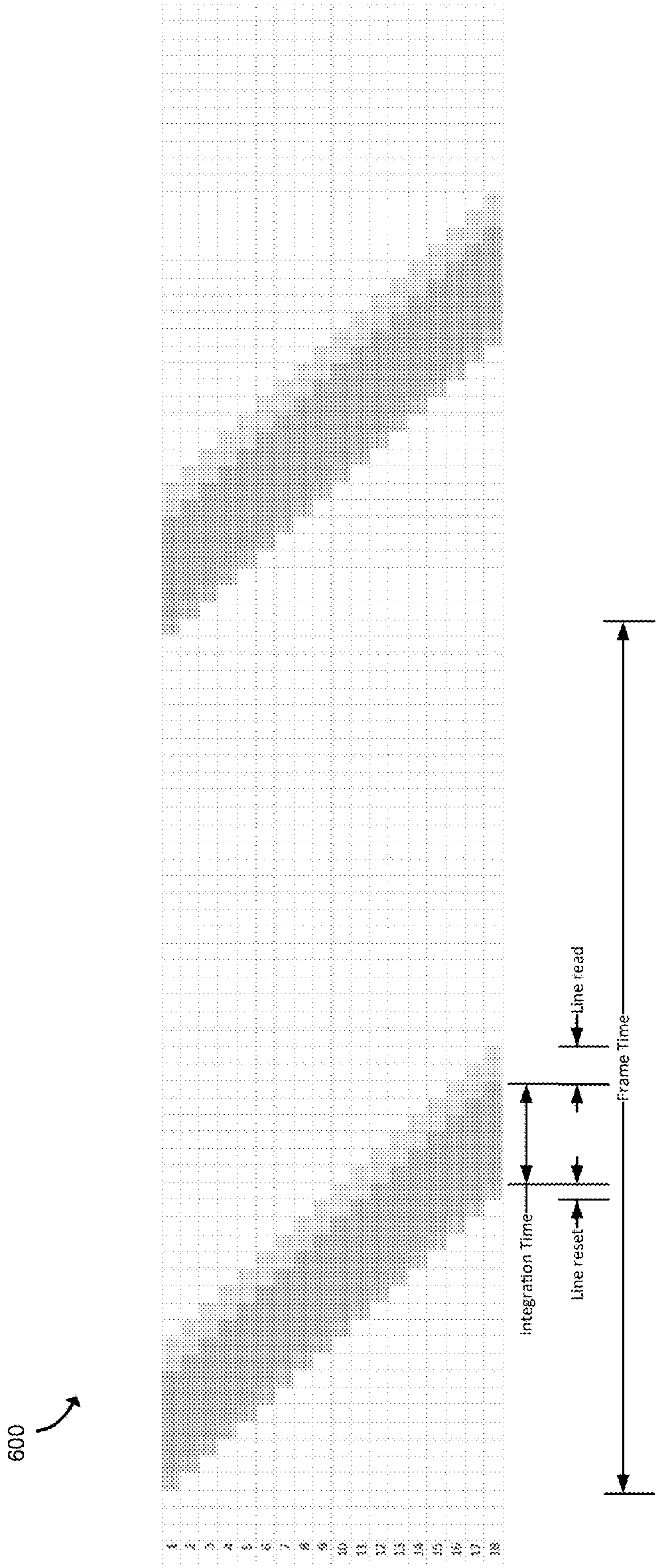
FIG. 6 depicts a diagram of rolling shutter sensor timing, with a shorter integration time than in FIG. 5.

Referring now to FIG. 5, a diagram 500 represents basic rolling shutter sensor timing. The vertical axis represents pixel rows and the horizontal axis represents time. The diagram 500 indicates a scenario with a fixed frame rate (fps, frame per second) with a period referred to as frame time. However, the integration time is somewhat less that the frame time. In the scenario represented in the diagram 500, the rolling shutter sensor 240, 242 is operating in a free-run mode or a slave mode (e.g., triggered by an external clock source). The image integration time represented in the diagram 500 is approximately 35% of the frame period. In embodiments of the image capture device 130, the frame period remains constant for a constant frame rate, which may be approximately 30 fps. An automatic brightness control of the image capture device 130 adjusts the integration time and various gains applied to the pixel signal. For example, if the brightness of the scene being imaged were increased due to addition of external illumination or to reduction of distance to the tissue being examined, timing similar to that represented in the diagram 500 may occur, but with reduced integration time, as represented in the diagram 600 of FIG. 6. As shown in the diagram 600, the integration is significantly shorter than in the diagram 500, while the frame time and frame rate are unchanged.

Figure 7:
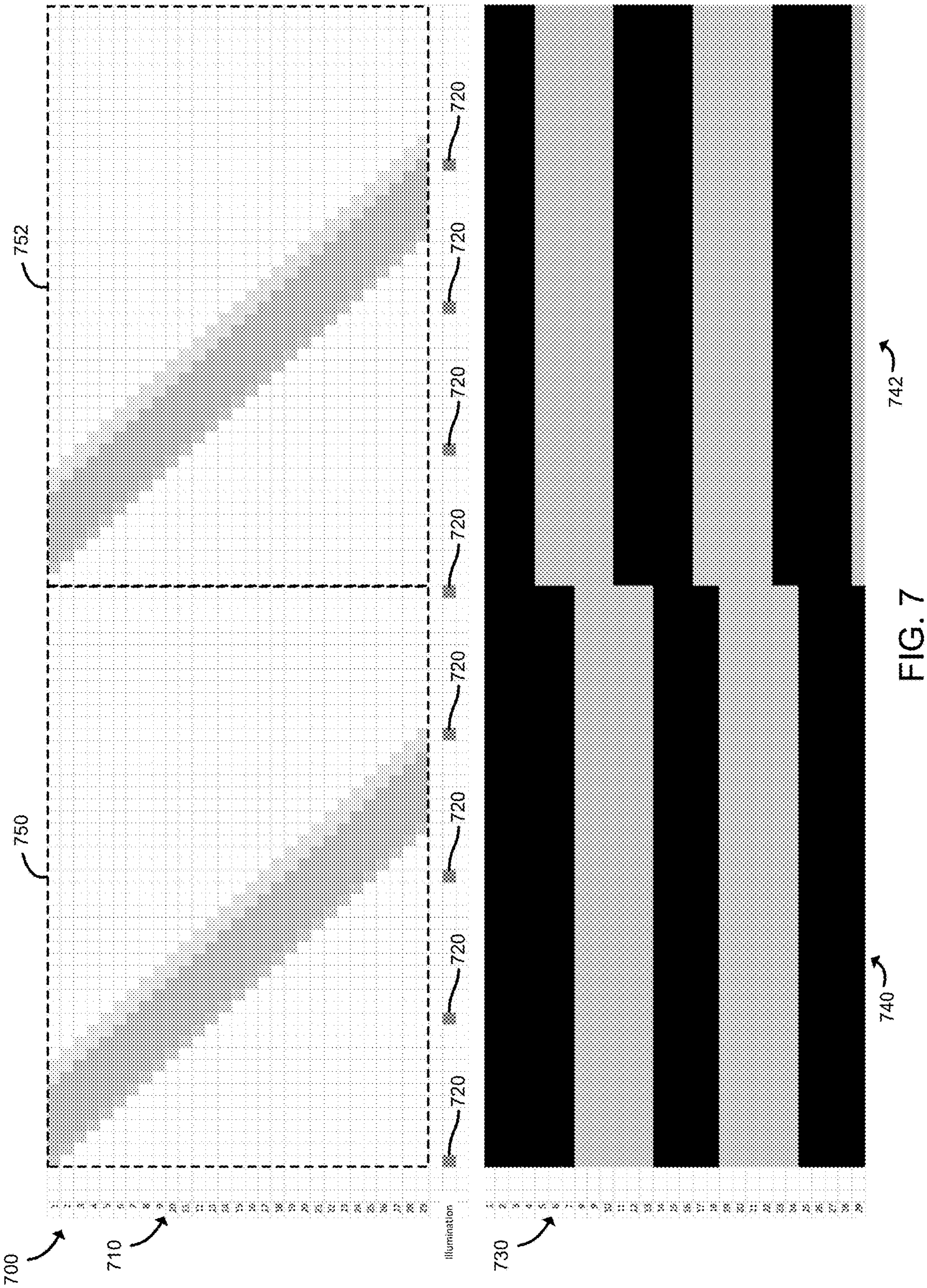
FIG. 7 depicts a diagram of rolling shutter sensor timing with illumination pulses and corresponding frames produced as a result.

Referring now to the diagram 700 in FIG. 7, an upper portion 710 is similar to the diagram of FIG. 600, except that a series of low-duty cycle illumination pulses 720 are represented as squares. A lower portion 730 of the diagram represents images 740, 742 produced during each frame 750, 752. The left image 740 corresponds with a first frame 750 of the timing diagram (e.g., the upper portion 710) and the right image 742 corresponds to a second frame 752 of the timing diagram (e.g., the upper portion 710). Each image 740, 742 is arranged with rows vertically by columns horizontally. The illumination duty cycle is 1/12. FIG. 7 illustrates the impact of pulsed illumination occurring during the rolling shutter image sensor timing. The situation represented in FIG. 7 corresponds with extremely short illumination pulses, for illustrative purposes. During the first frame 750, the illumination is on during some portion of the integration of lines 7 through 12 and lines 19 through 25. Accordingly, those lines collect some light from the image while all others remain dark. In the second frame 752, different lines are exposed as a result of the frame rate not being commensurate with the illumination frequency. As indicated, the phase of the sampling of the illumination pulses has shifted. The number of rows receiving illumination in any one band of the image 740, 742 is set by the ratio of the illumination pulse time to the integration time (e.g., exposure time). Further, the number of rows receiving no illumination is set by the ratio of the illumination off time to the row reset time. Further, completely unilluminated rows will only result when the illumination is off for an amount of time that is greater than the integration time.

Figure 8:
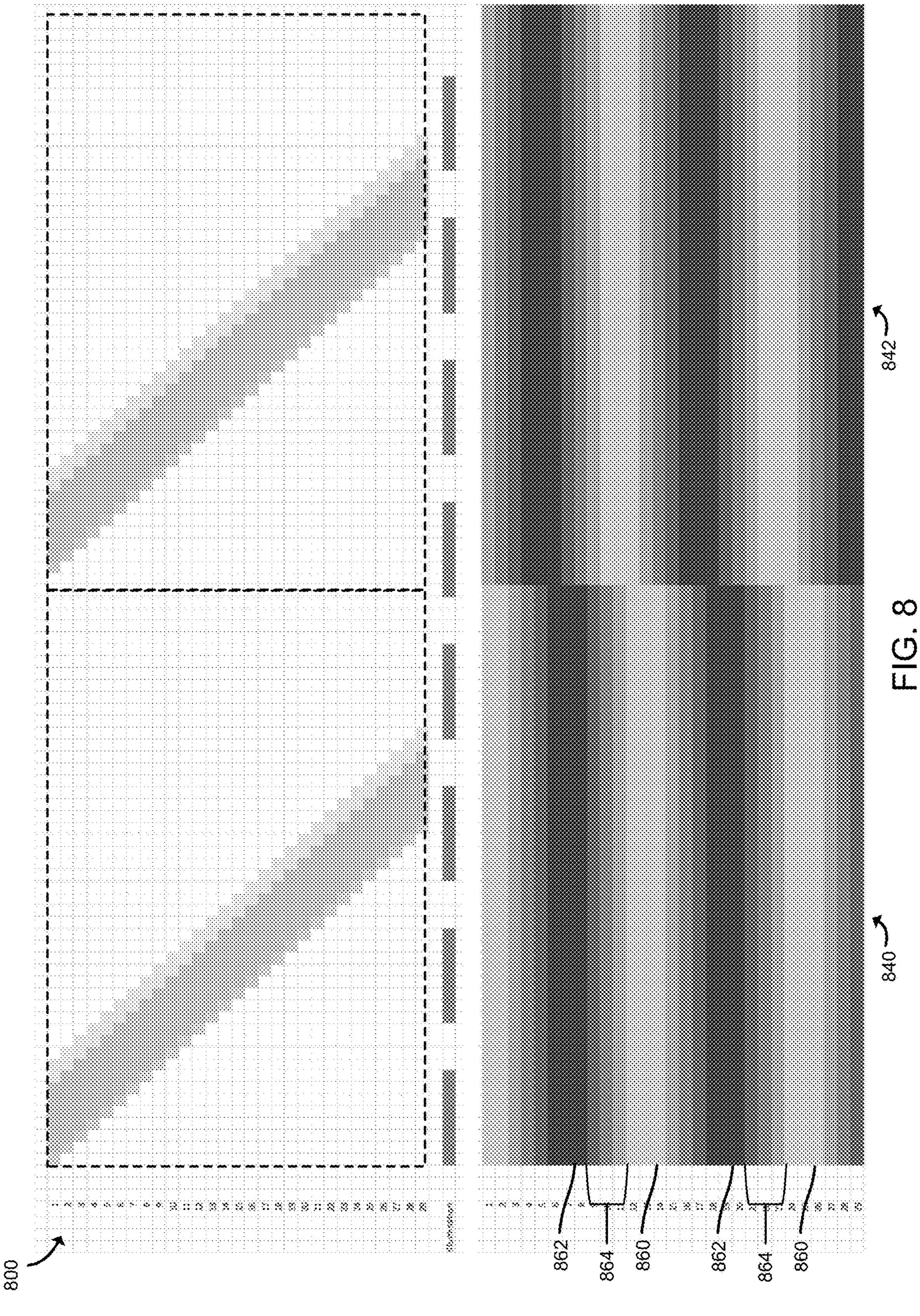
FIG. 8 depicts another diagram of rolling shutter sensor timing with longer illumination pulses than in FIG. 7, and corresponding frames produced as a result.

If the illumination duty cycle increases, as shown in the diagram 800 of FIG. 8, the resulting images 840, 842 are much different. That is, in the situation represented in the diagram 800, both the illumination on time and off time are comparable to the integration time. As a result, bright areas 860 and dark areas 862 of the images 840, 842 are of similar size and brightness gradations 864 are present as well. In the scenario represented in FIG. 8, the sensor timing is unchanged from the scenario represented in FIG. 7, but the illumination duty cycle has increased to 9/12 or 75%. The resulting luminance of the bands is scaled relative to the amount of time the brightest row is exposed.

Figure 9:
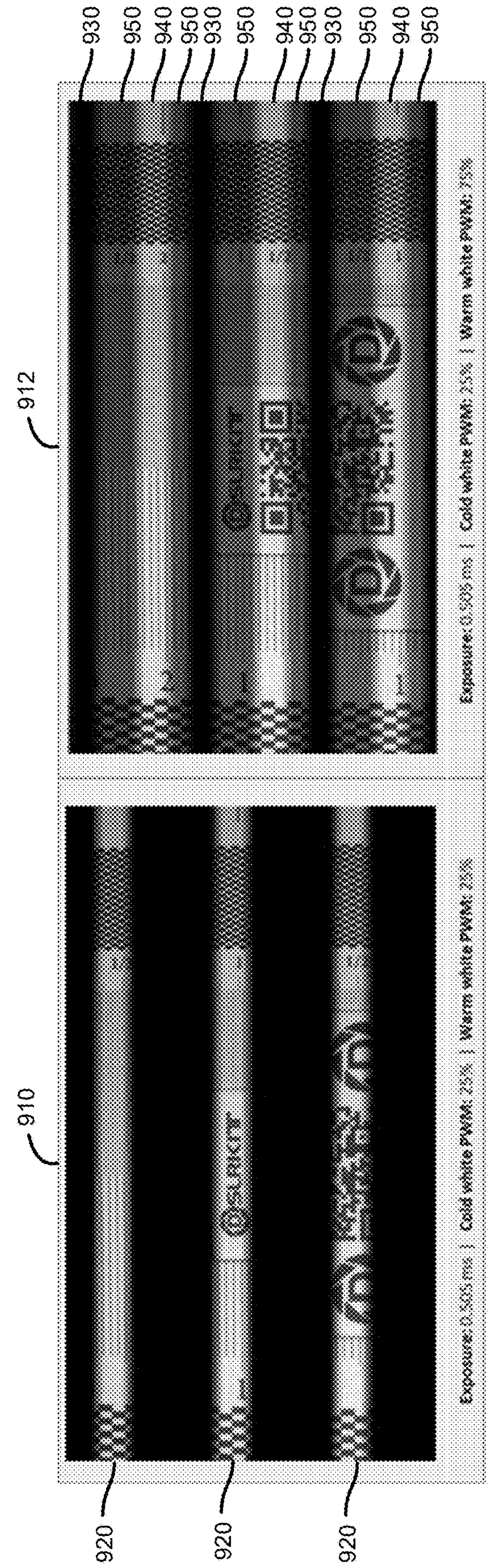
FIG. 9 depicts two images of a target captured using light sources with different color temperatures.

Some operating room boom lights offer the ability to tune the color temperature of the light to the surgeon's preference. Some such lights operate on the principle of having two or more color-temperature white LED sources that operate synchronously but with different duty cycles (DS). For example, a 4000 k light source may be created by combining a 6000K LED and a 3000K LED, using approximately 66% DC for the 3000K LEDs and a 33% DC on the 6000K LEDs to obtain the target spectral balance. Because the overall frequence of the illumination is sufficiently high, the human eye perceives a single color illumination. However, the image sensor 240, 242 operates at a higher frequency than the human eye, and, as a result, complications arise. Specifically, illumination devices with multiple pulse-width modulated light sources (e.g., the illumination device 110 with the light sources 140, 142 in the environment 100 of FIG. 1) complicate the banding structure of the rolling shutter artifact. The sensor rows where both colors of illumination are on will collect image data with one color balance and then, when one color of illumination is off and the other remains on (e.g., when one PWM light source 140 is off while the other PWM light source 142 is still on, as a result of the difference in duty cycles), the image sensor 240, 242 will collect rows with a different color balance. Accordingly, the resulting image has multiple white balance points within the data. An example is illustrated in the images 910, 912 shown in FIG. 9.

Several approaches may be used to solve the technical problem of reducing or eliminating visual artifacts that result from the combination of a rolling shutter with pulse-width modulated light sources. In one aspect, one potential approach is to utilize an image sensor with a global shutter, rather than a rolling shutter. Utilizing a global shutter image sensor eliminates the banding artifacts by exposing all pixels simultaneously. However, frame-to-frame artifacts may still occur. By way of example, the timing of the image exposure may span two pulses of the light source in one frame and one pulse of the light source in a second frame, and continue according to that pattern. In that scenario, the brightness of the acquired image differs between frames by a factor of two. The brightness difference may be addressed by sensing the light or image content and synchronizing the image sensor acquisitions to the light sensor. In another example, the image capture device 130 senses the frequency and timing of PWM, and compensates for the frame-to-frame brightness difference.

Continuing the discussion of using an image sensor with a global shutter, a potential drawback of global shutter sensors is that they have larger pixels (e.g., by a factor of 2.5) than rolling shutter sensors. The larger pixels (e.g., lower pixel density) is a result of the need to incorporate additional circuitry to latch the entire image. That is, every pixel must be read while the next image is acquired. The additional circuitry adds weight and cost. Further, the larger pixels would cause the corresponding optics to be commensurately larger. Additionally, as described above, the image capture device 130, in the illustrative embodiment, enables digital zoom, which relies on a relatively high pixel count. These factors reduce the suitability a global shutter image sensor for the image capture device 130, especially in embodiments in which the image capture device 130 is a wearable device.

In another aspect, another approach is to utilize a global reset mode for a rolling shutter sensor. Most rolling shutter sensors have an exposure mode known as global reset, in which all pixels are triggered to begin exposure simultaneously. However, each line of the sensor may be active for an increasing amount of integration time from the first line to the last line. The global reset mode originates from the need to allow rolling shutter sensors to work with electronic flashes in photography applications. In one example, a rolling shutter sensor in global rest mode will avoid artifacts by synchronizing the global reset to the frequency of the light and all lines can be exposed and read prior to the occurrence of additional light pulses.

In one example, global reset may require additional time to operate from frame to frame, as compared to the normal mode of operation for a rolling shutter image sensor. As a result, obtaining frame rates that provide the appearance of smooth video (e.g., 60 frames per second) may be difficult. Additional time is required to read all of the lines of the image after the initial image integration. If an image sensor is designed to operate at 60 to 100 frames per second and the light source is pulsing at, for example 300 Hz, there may be insufficient time between light pulses to read the entire image. Accordingly, banding artifacts may still be produced as a result of different parts of the image being exposed to different numbers of light pulses.

In yet another aspect, another approach is to utilize one or more mechanical shutters. A mechanical shutter can be operated to allow light to reach the image sensor only when the light is in an ON state or synchronously with the pulsing of the light source(s), and remain closed during an image sensor readout. However, such an approach has limitations. For example, mechanical devices have limited lifetimes. A mechanical shutter with an extraordinary lifetime might operate reliably for 3,000,000 cycles. However, in a video system in which the shutter is operated at a full video rate of, for example, 60 frames per second, such a shutter would be reliable for a mere fourteen hours.

The solutions provided herein, which may be implemented by embodiments of the image capture device 130, may operate in accordance with the following constraints. One constraint is that the solutions operate with wide ranging light pulse frequency. Operating boom lights are known to be pulsed at frequencies ranging at least as wide as 300 Hz to 1.65 kHz. Further, the solutions operate with a wide range of duty cycles. The brightness of operating room boom lights is controlled by changing the duty of a corresponding drive, over cycle ranges from 5% to 100%. Another constraint is that the solutions operate with lights having variable color temperatures. Modem, high-end operating room boom lights allow the user to change the color temperature. One of the ways this is implemented is by using more than one color temperature white LED in the boom light and applying different duty cycles to the different color temperature LEDs, at the same synchronized frequency. Further, the solutions accommodate variations in frequency associated with a given light source. The frequency of light pulsation is likely to vary a small amount over time or in response to changes in temperature. The solutions described herein adapt to those changes in frequency. It should be appreciated that the processing, computing and controlling steps may be carried out by the controller 230.

Further, embodiments that implement the solutions described herein may operate with low latency. A surgical visualization system can have at most 100 ms of latency from tissue to display. The solution to the banding issue cannot involve acquiring a number of images to be stacked. A potential scenario may include a light source that operates at a 5% duty cycle and a 300 Hz frequency. If images are acquired with a short integration time, each resulting image will be 95% black. If multiple images are acquired with carefully timed exposure, the full image could be acquired in 20 frames. With a high speed image sensor operating at 120 frames per second, the exposure time would be 170 milliseconds. Accordingly, some parts of the image would have far too much latency. Additionally, significant motion artifacts would be present. As a result, embodiments that implement the solutions described herein may operate using as close to a single frame as possible and that frame may not have any dark bands where there is no information to be corrected.

In one aspect, the solutions described herein are based on the principle that the integration time cannot be less than the period of light pulsation. For the slowest light likely to be encountered (e.g., 200 Hz), the shortest integration time is not less than 5 ms. The resulting implications for dynamic range are significant. Given the various use cases, a viable system should have a dynamic range on the order of 50× of 17 dB. Because the integration time of an image sensor can be adjust from approximates 20 microseconds to the inverse of the frame rate or 16 milliseconds in the case of a 60 frames per second system, the dynamic range is largely accommodated by the integration time of the image sensor. A lower limit of 5 milliseconds for integration time reduces the dynamic range of the image sensor to a mere 3×. Practically, another 3× of gain can be added to the system without significantly increasing the appearance of image noise. Another 5× of more of dynamic range is provided by another source.

The dynamic range has significance in how an imaging system presents scene brightness. Typical operating room or even smart phone camera imaging systems automatically adjust the imaging parameters to present the scene at a brightness that is generally considered to be normal or standard. In situations of reduced illumination, sensor integration time increases and/or image gain increases to present the scene at the standard brightness. The function of automatic brightness control is referred to as automatic gain control (AGC) herein. The dynamic range of the system determines what range of scene illumination brightness can be presented at the standard brightness without resulting in noticeable noise. If the dynamic range is insufficient, image quality declines because the image is overly bright, excessively dark, or contains unacceptable amount of noise.

In one aspect, solutions described herein to reduce or eliminate artifacts resulting from the combination of rolling shutter image sensors with pulse-width modulated illumination may fall into two main categories. In one example, one category is implementations that rely solely on image processing. In other words, in such implementations, the only information in the system are the images that have been acquired. In another example, another category is implementations that utilize additional sensing. The additional sensing provides new information to be included in the operations of the system. Specifically, in at least some embodiments, a light sensor (e.g., the light sensor 280) samples the illumination directed towards the image capture device 130.

Figure 10:
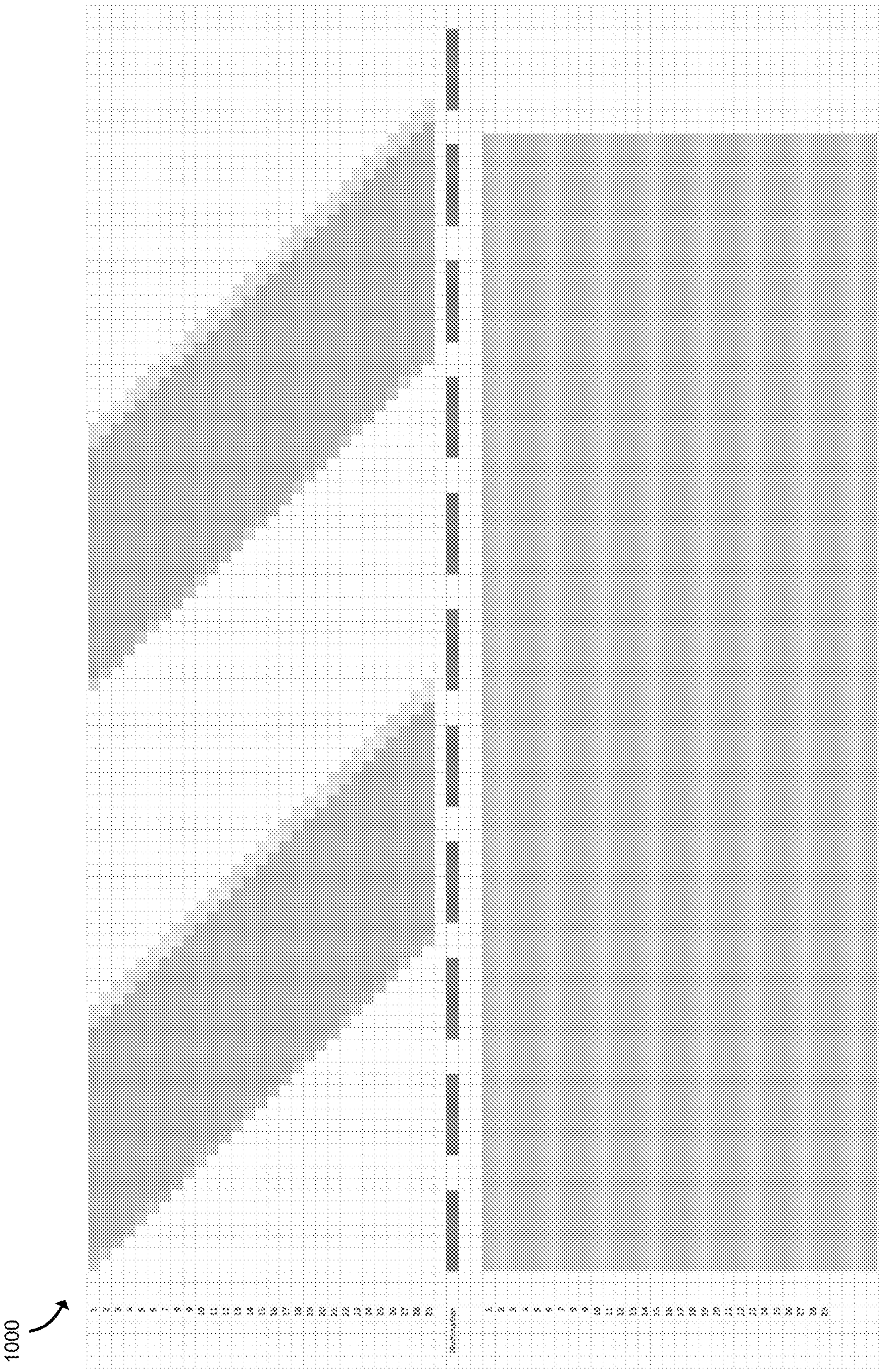
FIG. 10 depicts a diagram of rolling shutter sensor timing in which an image sensor operates at two periods of a light frequency, and corresponding frames produced as a result.

In one aspect, the image capture device 130 eliminates or reduces banding artifacts of an image by matching the image sensor integration time with an integer multiple of the light pulsation period. Doing so ensures that regardless of when each line of the image sensor is exposed, each line sees identically a target illuminated for the same amount of time. Such a result is represented in the timing diagram 1000 of FIG. 10. In the diagram 1000, the integration time of the image sensor operates at two periods of the light frequency. The light period is 10 grid boxes and the integration time is 20 grid boxes. The light source operates at 70% duty cycle. Every line of the image sensor is exposed to 14 grid boxes of illumination, resulting in images without artifacts. It should be appreciated that the integration time of the image sensor may operate at any integer number of periods of the light frequency. It should be further appreciated, in some embodiments, the integration time may also operate at a non-integer number of periods of the light frequency. It should be appreciated that these processing, computing and controlling steps may be carried out by the controller 230.

In one aspect, the aforementioned approach maintains some dynamic range in the integration time, since the integration time can be any multiple of the light pulse period up to the inverse of the frame rate (e.g., 1/frame rate). For example, if the light frequency is 300 Hz, the integration time may be 3.3 ms, 6.6 ms, 10 ms. 13.3 ms, or potentially 16.6 ms. The resulting dynamic range is 4× (6 dB). If the light frequency is higher, such as 1.5 kHz, the integration time may be any multiple of 66.7 ms, up to 16.7 ms. The resulting dynamic range is 25× (14 dB).

In one example, the banding may be eliminated by evaluating the residual banding and adjusting the integration time, frame rate, or other imaging parameters dynamically. In one embodiment, a threshold value for the severity of residual banding artifacts is set to determine whether the artifacts are acceptable or unacceptable. If the severity exceeds the threshold, the image capture device 130 will determine the artifacts to be unacceptable and will dynamically adjust the frame rate, integration time, or other parameters to further reduce banding. If the severity is equal to or below the threshold, the device will determine the artifacts to be acceptable and will stop dynamic adjustments of those parameters. In one embodiment, the severity of residual banding artifacts may be quantified using image processing techniques that analyze spatial frequency patterns and intensity variations across the image. A banding severity metric may be computed based on the standard deviation or variance of pixel intensities along uniform regions, or through frequency domain analysis using Fast Fourier Transform (FFT) to detect periodic noise patterns. Thresholding techniques may then be applied to this metric to classify the artifacts as acceptable or unacceptable. In another embodiment, the severity of residual banding artifacts may be determined by analyzing edge consistency across uniform background regions. A gradient-based method may be used to detect abrupt intensity transitions that align with known banding directions. The number and strength of these transitions may be aggregated into a banding severity score, which is then compared against a predefined threshold to assess acceptability. n yet another embodiment, a machine learning-based classifier may be employed to evaluate the severity of residual banding artifacts. The classifier may be trained on labeled image data containing varying levels of banding severity. During operation, features such as local contrast, texture uniformity, and periodicity are extracted from the captured image and input into the model, which outputs a severity score or classification label indicating whether the artifacts are within acceptable limits.

Dynamic programming or other control algorithms may be used for dynamic adjustment of frame rate to reduce banding. This may be particularly useful if the frequency of the illumination pulses drifts during the imaging session. In addition to dynamic programming, other suitable control algorithms may include proportional-integral-derivative (PID) control, model predictive control (MPC), fuzzy logic control, and reinforcement learning-based control. These algorithms may be configured to monitor image quality metrics in real time and adjust imaging parameters such as frame rate, integration time, or gain to minimize residual banding artifacts. It should be appreciated that these processing, computing, and controlling steps may be carried out by the controller 230.

Figure 11:
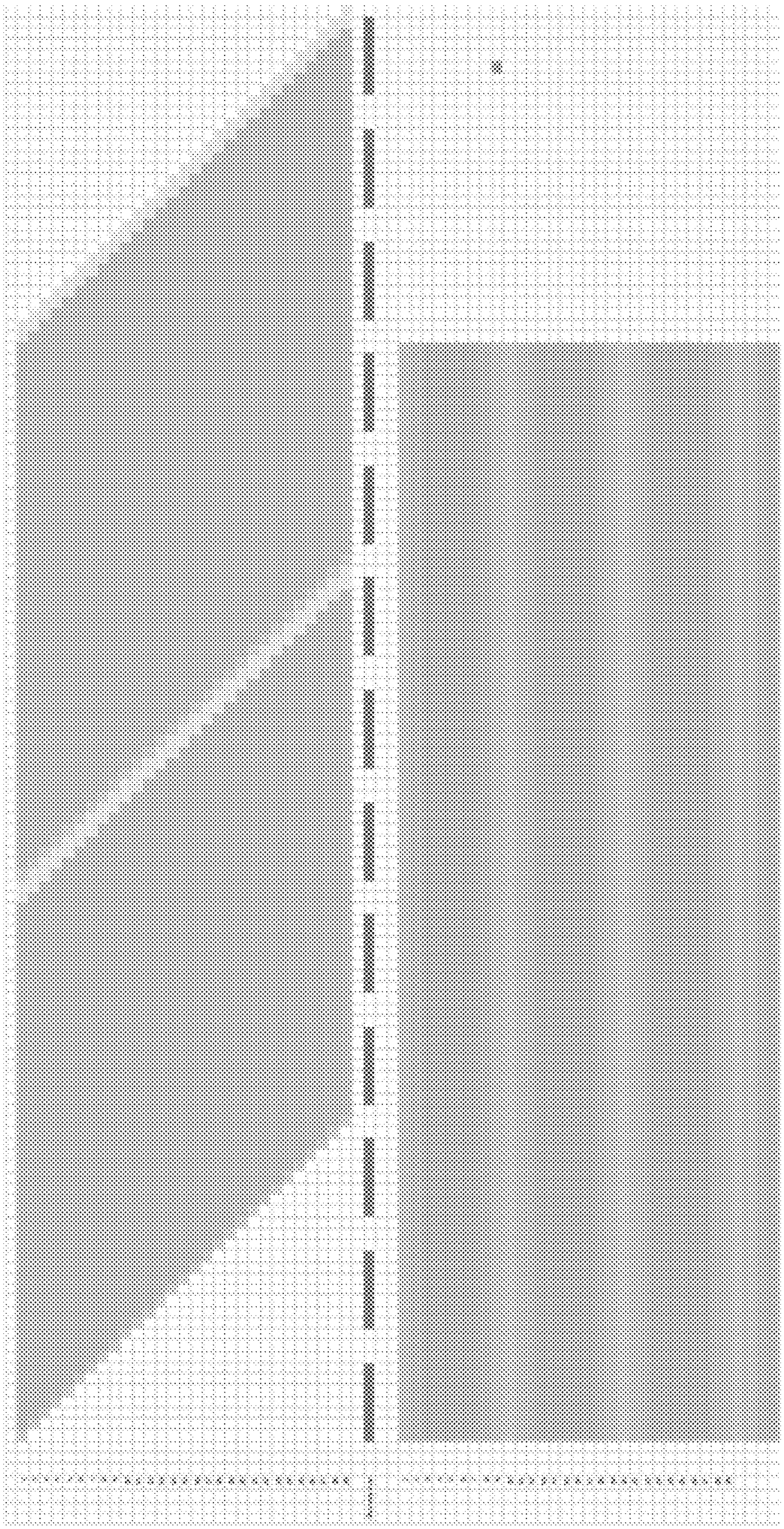

In one aspect, the image capture device 130 reduces the banding artifacts, but does not completely eliminated the banding artifacts. In one example, if the integration time is only a small amount different than the period of the illumination but larger than the period of illumination, some lines will be slightly differently illuminated. Such residual artifacts may be corrected with additional image processing. In another embodiment, the image capture device maximizes the integration time. Doing so ensures that the image sensor receives the greatest amount of light energy, thereby minimizing noise. The residual banding in such a scenario is the inverse of the ceiling (the smallest integer that is greater than or equal to) of N pulses per integration (1/ceil(N pulses per integration)). The diagram 1100 of FIG. 11 represents the above approach. Maximizing the exposure time has the drawback of sacrificing dynamic range from the image sensor integration time adjustment. In the scenario represented in FIG. 11, integration time is maximized in the presence of illumination operating at just less than five pulses per integration time. With the duty cycle at 70%, an 8.5% banding artifact occurs. If the duty cycle were reduced to a very small number, such as 5%, some lines with five pulses of illumination and a small number of lines with four pulses of illumination would result, with a 20% artifact at worst.

As described above, in some embodiments, the image capture device 130 may utilize a light sensor 280 for correcting residual banding. Such a light sensor 280, which may be embodied as a photodiode, an RGB (red, green, blue) photodiode, or a phototransistor, may sample the illumination at a rate equal to the line rate of the image sensor 240, 242. In doing so, the light sensor 280 provides information (e.g., to the controller 230) to enable a determination of the relative brightness of each line. The image capture device 130 may perform box car averaging or other averaging algorithms to determine the average illumination during the exposure of each line. Further, the controller 230, in the illustrative embodiment, extracts (e.g., determines) the maximum brightness of the corresponding frame.

In such embodiments, the image capture device 130 may correct residual banding by multiplying each line by the ratio of the frame maximum brightness to the line brightness (frame maximum brightness/line brightness). To address illumination made up of multiple color temperature sources, embodiments of the image capture device 130 may utilize an RGB sensor (e.g., an RGB photodiode). In such embodiments, the image capture device 130 may perform the method described above, to each of the individual colors of each line. In implementing the method, the light sensor 280 samples the illumination from the illumination device 110 rather than the light reflected from the target 120 being imaged, in instances in which the illumination includes light from multiple color temperature light sources 140, 142. If the illumination comes from a single light source 140, the light reflected from the target 120 may be sufficient to enable the image capture device 130 to correct the residual banding with the above method.

In some embodiments, as the image capture device 130 processes each image, the image capture device 130 utilize statistics of the row artifacts of one frame to correct the lines of the subsequent frame. If the integration time is within a predefined threshold of a multiple of the period of the light modulation, the bands do not move significantly across the rows of the image sensor 240, 242. Accordingly, the image capture device 130 may utilize information about the brightness of one or a plurality of rows from one frame to correct rows in subsequent frames. It should be appreciated that these processing, computing and controlling steps may be carried out by the controller 230.

To account for differences in illumination and differences in imaging target (e.g. bright skin vs dark muscle tissue in a cavity), it is desirable for a system to have sufficient dynamic range. The image sensor integration time may be limited to a dynamic range of 4× and gain another 3×. Accordingly, in some embodiments, the image capture device 130 may utilize an additional tunable component 270, 272 to provide that dynamic range. The only other parameter that can be altered dynamically is the amount of light reaching the image sensor 240, 242.

Further to the above, in some embodiments, the image capture device 130 adjusts the illumination to the image sensor 240, 242 with an imaging lens with a stop plane and a tunable aperture positioned in that plane. In some embodiments, the image capture device 130 includes, as the tunable component 270, 272, a motor driven mechanical iris to selectively reduce the light through the lens. In some embodiments, the image capture device 130 utilizes multiple stop planes to mitigate changes in depth of field resulting from the motor driven mechanical iris.

Some embodiments of the image capture device 130 may include a tunable crossed polarizer as the tunable component 270, 272. Light can be attenuated by crossing two linear polarizers and adjusted by changing the angle of polarization between the two polarizers. Accordingly, in some embodiments, the image capture device 130 may include two polarizers that are located in front of a corresponding lens 260, 262 or image sensor 240, 242 or in the stop plane, with one of the linear polarizers being motor-driven to rotate, such as in response to a corresponding signal from the controller 230. In some embodiments, the image capture device 130 may include, as the tunable component 270, 272, a field-driven liquid crystal filter. By changing the voltage applied to the LC filter, such as with the controller 230, the image capture device 130 may selectively attenuate the light that reaches the image sensor 240, 242.

Figure 12:
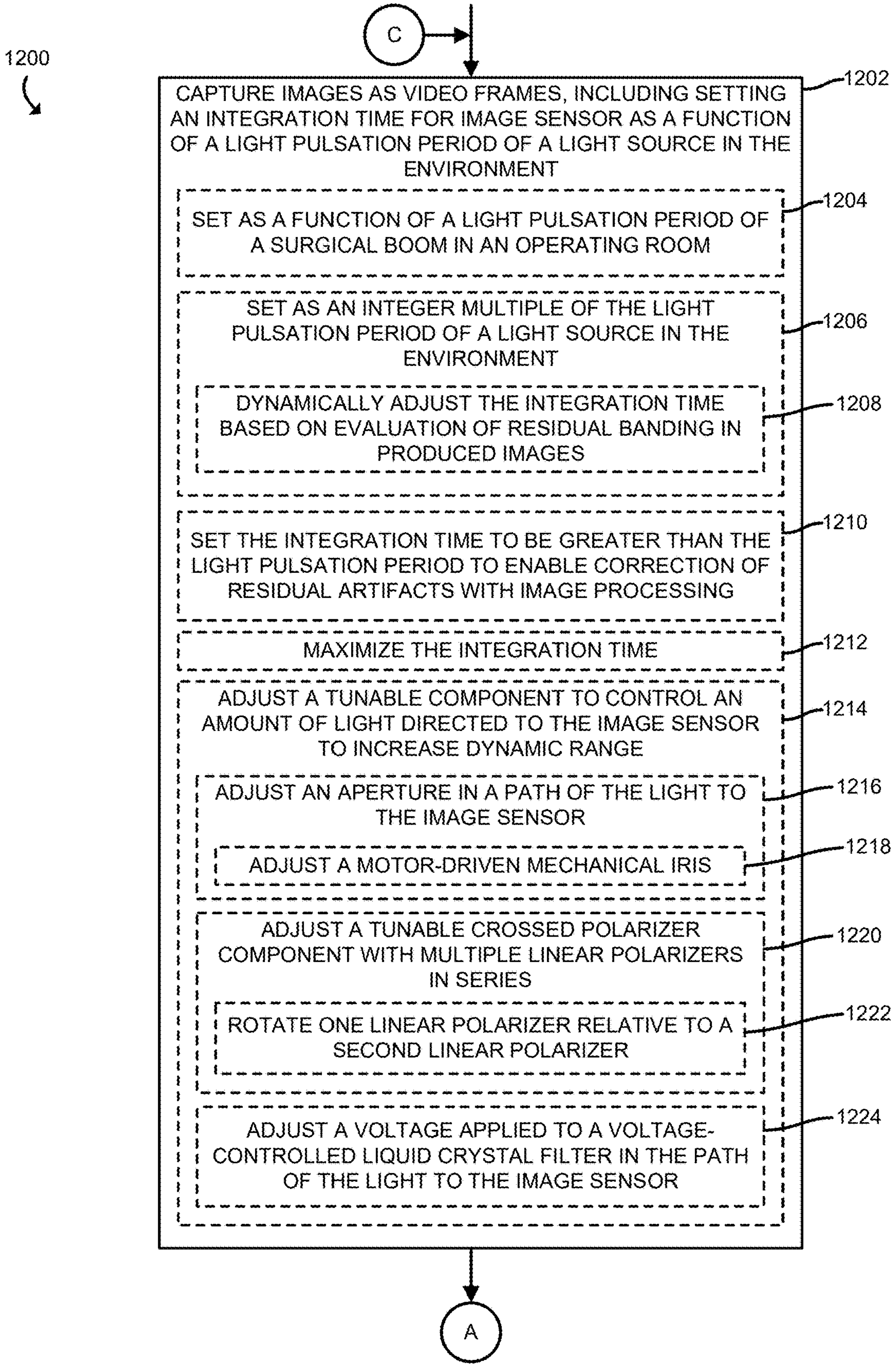

Referring now to FIG. 12, in operation, the system (e.g., the image capture device 130) may perform a method 1200 to reduce visual artifacts when imaging under pulse-width modulated illumination. The method 1200, in the illustrative embodiment, begins with block 1202, in which the system (e.g., the image capture device 130) captures images as video frames. In doing so, the system sets an integration time for an image sensor 240, 242 as a function of (e.g., based on) a light pulsation period of a light source 140, 142 in the environment. In doing so, and as indicated in block 1204, the system sets the integration time as a function of a light pulsation period of a surgical boom (e.g., the illumination device 110) in an operating room. As described above, modem surgical booms utilize light sources 140, 142 that operate at frequencies that fall within a relatively wide range, such as 300 Hz to 1.65 kHz.

In the illustrative embodiment, the system (e.g., the image capture device 130) sets the integration time as an integer multiple of the light pulsation period of a light source 140, 142 in the environment, in block 1206. In the illustrative embodiment, the system may set the integration time to an integer multiple of the light pulsation period, up to the inverse of the target frame rate (e.g., frames per second) for a resulting video to be presented to a user. Referring back to the example described with reference to FIG. 10, if the light frequency is 300 Hz, the integration time can be 3.3 ms, 6.6 ms, 10 ms. 13.3 ms, or potentially 16.6 ms. As indicated in block 1208, the system may dynamically adjust the integration based on a continual evaluation of residual banding in the produced images. That is, without prior data indicative of the actual frequency and pulsation period associated with the pulse-width modulated light source(s) 140, 142, the system may continually adapt and adjust to hone in on the frequency and pulsation period of the light source(s) 140, 142 to iteratively improve on the reduction of visual artifacts such as banding.

As indicated in block 1210, the system, in some embodiments, may set the integration time to be slightly greater than the light pulsation period to enable correction of the residual artifacts with image processing, as described in more detail herein. In block 1212, in some embodiments, the system may maximize the integration time, as described above, relative to FIG. 11. In at least some embodiments, the system may adjust a tunable component 270, 272 to control an amount of light directed to the image sensor 240, 242 to increase dynamic range, as indicated in block 1214. In doing so, in block 1216, the system may adjust an aperture in a path of the light to the image sensor 240, 242. For example, the system may adjust a motor-driven mechanical iris to selectively increase or decrease the aperture and amount of light reaching the corresponding image sensor 240, 242, as indicated in block 1218. Additionally or alternatively, the system may adjust a tunable cross polarizer component with multiple linear polarizers in series to control the amount of light reaching the image sensor 240, 242, as indicated in block 1220. In doing so, in block 1222, the system may rotate one linear polarizer relative to a second linear polarizer to selectively adjust the attenuation of the light passing through the tunable component 270, 272 to the image sensor 240, 242. In some embodiments, the system may adjust a voltage applied to a voltage-controlled liquid crystal filter in the path of the light to the image sensor, as indicated in block 1224. By selectively increasing or deceasing the applied voltage, the image capture device 130 may control the corresponding amount of light passing through the filter to reach the image sensor 240, 242.

Continuing the method 1200, the system, in block 1226, may determine whether to perform image processing. That is, the system may determine whether visual artifacts, such as banding, are present in captured image(s) from block 1202 of the method 1200. If so, the method 1200 advances to block 1228 in which the system performs image processing to correct residual banding in the image(s). In doing so, the system may determine a relative brightness for each row of a captured image, as indicated in block 1230. In determining the relative brightness, in block 1232, the system may perform box car averaging for each row to determine an average illumination for each row. That is, the system may replace a group of consecutive data points indicative of brightness with an average, thereby filtering out rapidly changing signals by averaging over a relatively long time while having a negligible effect on slowly changing brightness values.

In some embodiments, the system may utilize illumination data from a light sensor 280, such as a photodiode, that samples at a rate that is equal to a line rate of the image sensor 240, 242, as indicated in block 1234. The system, in block 1236, may utilize illumination data from a set of multiple light sensors 280, each corresponding to a different light source 140, 142 in the environment. In doing so, the system may utilize illumination data associated with different components of a color temperature, as indicated in block 1238.

In some embodiments, the system may address illumination made up of multiple color temperature sources with an RGB sensor (e.g., an RGB photodiode) to determine the intensity or brightness of each corresponding color channel. Continuing the method 1200, the system may determine a maximum brightness for an image as a function of (e.g., based on) the relative brightness for each row, in block 1240. That is, the system may determine the relative brightness of each of the rows of the image, determine which relative brightness is the greatest, and determine the maximum brightness for the image based on the greatest relative brightness among the rows of the image. The system may multiply each row of a given image by a ratio of the maximum brightness of the image to the relative brightness of the corresponding row, as indicated in block 1242. In doing so, and as an optimization to increase computational efficiency and reduce energy usage, the system may utilize brightness ratios determined from one or more previous images rather than calculating brightness ratios for each row for the present image, in block 1244. That is, for a defined number of sequential images or for a set of images captured for each of multiple image sensors 240, 242 (e.g., for a left eye and a right eye view of the environment), the system may select one image for which to calculate the relative brightness for every row, the maximum brightness of the image, and the ratio of the relative brightness of each row to the maximum brightness of the image, and utilize those determined values for the other images in the set. The size of the set may be predefined and/or the system may adjust the size as a function of a determined degree to which the visual artifacts, such as banding, are successfully removed from the corresponding images.

Figure 14:
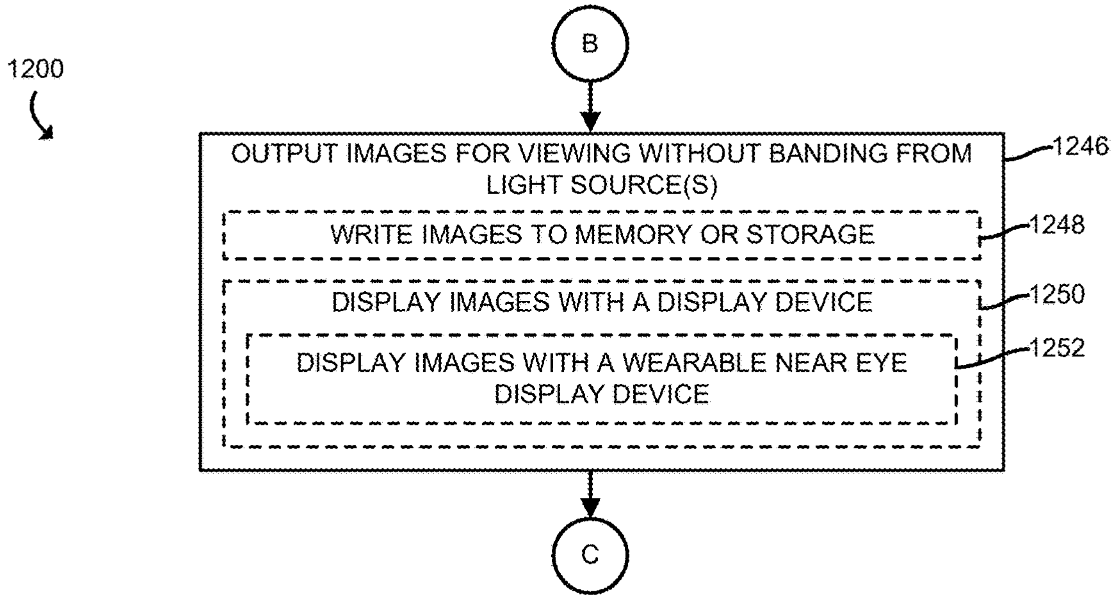

Afterwards, or if the system determines in block 1226 not to perform image processing, the method 1200 advances to block 1246 of FIG. 14 in which the system (e.g., the image capture device 130) outputs images for viewing without banding (e.g., visual artifacts) from pulse-width modulated light sources 140, 142. In doing so, the system may write the images to memory or storage, as indicated in block 1248. Further, the system may display the images with a display device, as indicated in block 1250. For example, in the illustrative embodiment, the system displays the images with a wearable near-eye display device, such as the near-eye three dimensional display 220, as indicated in block 1252. Subsequently, the method 1200 loops back to block 1202 to capture one or more additional images from the environment.

In one aspect, the following operations may be performed by the image capture device 130. As one step, the image capture device 130 may dynamically adjust integration time, tuned based on the sensed residual banding. Doing so may involve a user calibration operation to initialize the integration time to be appropriate for the light in the environment, such as an operating room. As a further step, the image capture device 130 may perform image processing for row correction, to reduce any image banding artifacts that remain after dynamically adjusting the integration time. Further, the image capture device 130 may provide dynamic range by utilizing an electronically controlled filter or other tunable component 270 to selectively attenuate the light reaching the image sensors 240, 242.

Figure 15:
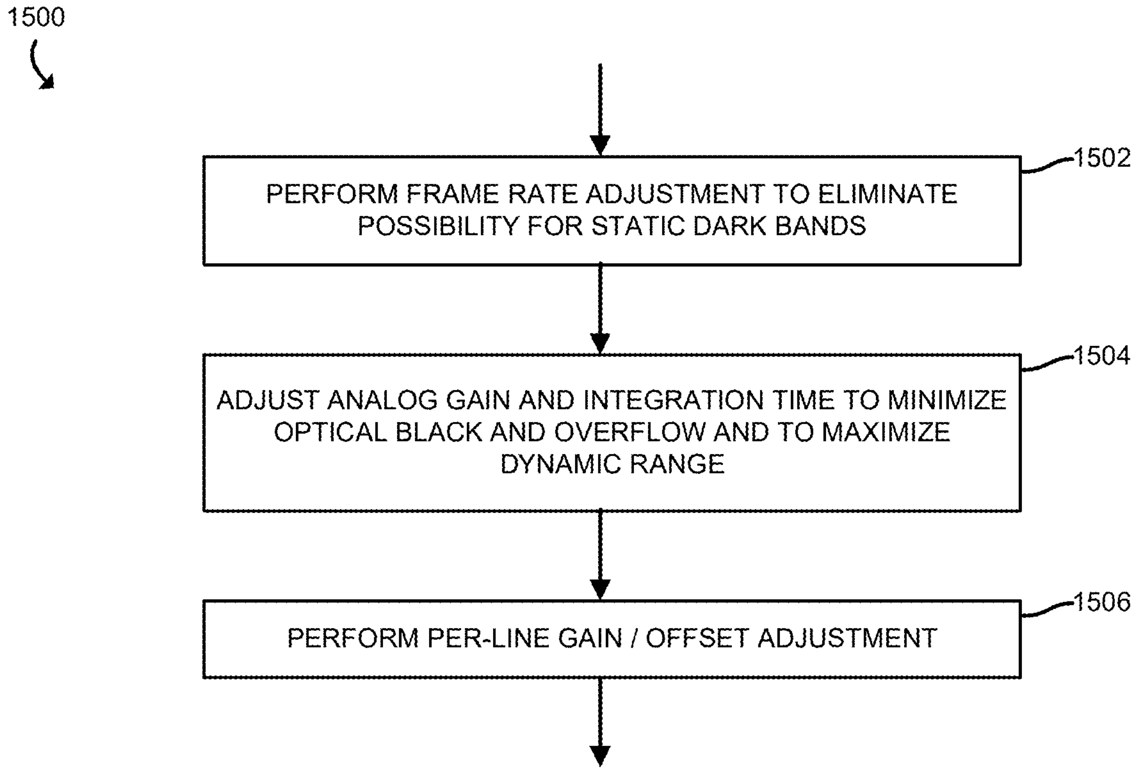
FIG. 15 is a high level flowchart of an embodiment of a method that may be performed by the image capture device to reduce visual artifacts when imaging under pulse-width modulated illumination.

In at least some embodiments, at a high level, the system (e.g., image capture device 130) may perform the method 1500 as represented in FIG. 15 to reduce or eliminate visual artifacts when imaging under pulse-width illumination. In block 1502, the system may perform frame rate adjustment to eliminate the possibility for static dark bands. Further, in block 1504, the system may adjust an analog gain and integration time to minimize optical black and overflow, and to maximize dynamic range. Additionally, in block 1506, the system may perform per-line gain/offset adjustment.

Figure 16:
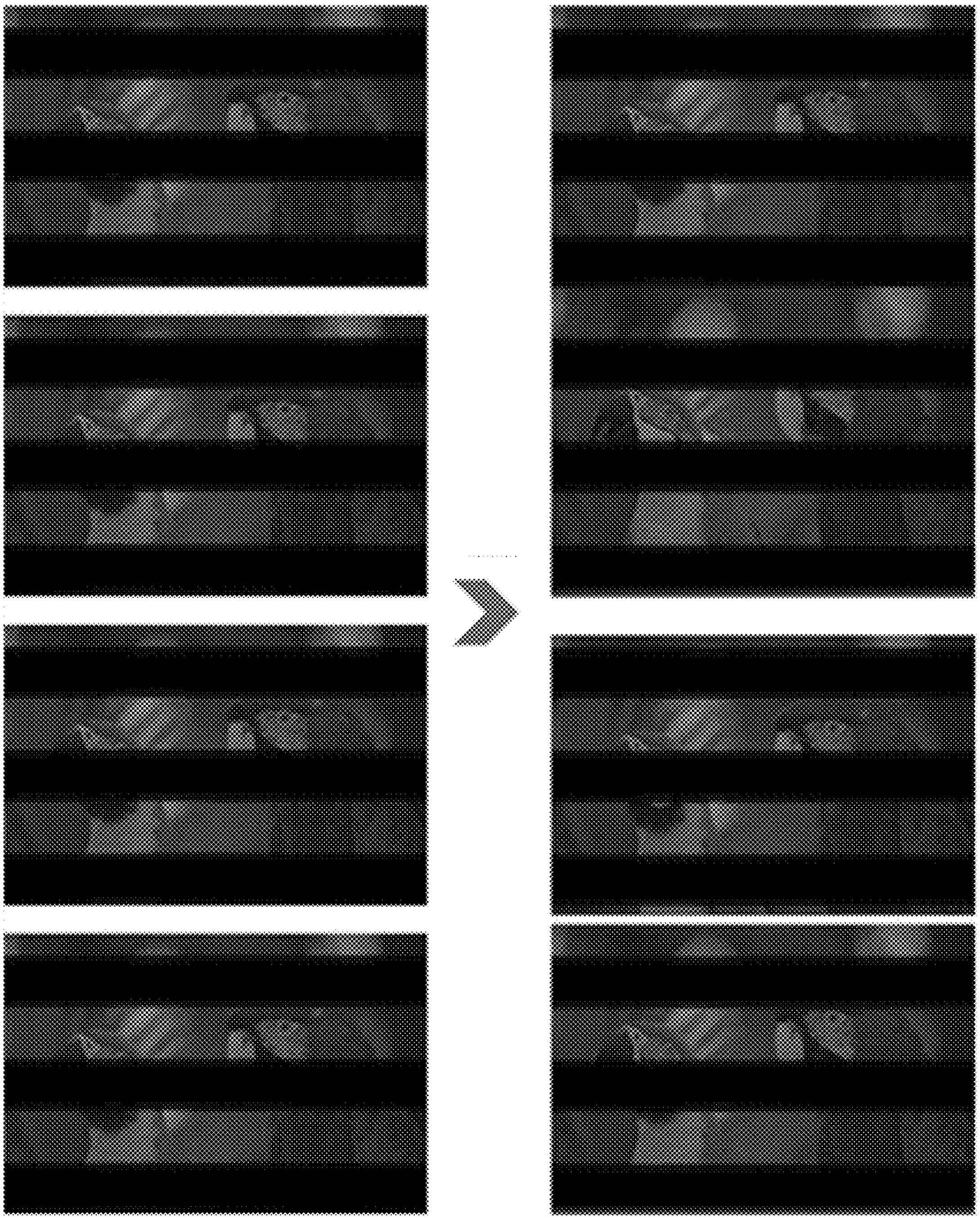
FIG. 16 depicts images resulting from performing frame rate adjustment in accordance with the method of FIG. 15.

In some embodiments, the system (e.g., the image capture device 130) may perform black band and/or flicker correction with or without an external light sensor. In an example, the dynamic, per-pixel adjustment of sensor footage may be achieved without the use of a dedicated light sensor according to the three step schema referenced above relative to FIG. 15. In performing the frame rate adjustment associated with block 1502, the system detects image rows having optical black (OB) and saturated/overflow pixels from a number of frames. Further, during a calibration stage, which may be performed during a period when white-balance is being derived, the system may manipulate the frame rate such that a sequence of frame periods is determined that does not have a matching even frequency light. In a 4-frame window with FPS0=28.5 FPS, FPS1=31.5 FPS, FPGS2=20.5 FPS, and FPS3=30.5 FPS, the average FPS is 30 FPS. In accordance with the method, the system derives a multi-frame window in which bands are sufficiently far apart to cause every line of the frame to be populated in one of the analyzed frames. Results 1600 of performing frame rate adjustment in accordance with the method are shown in FIG. 16.

Figure 17:
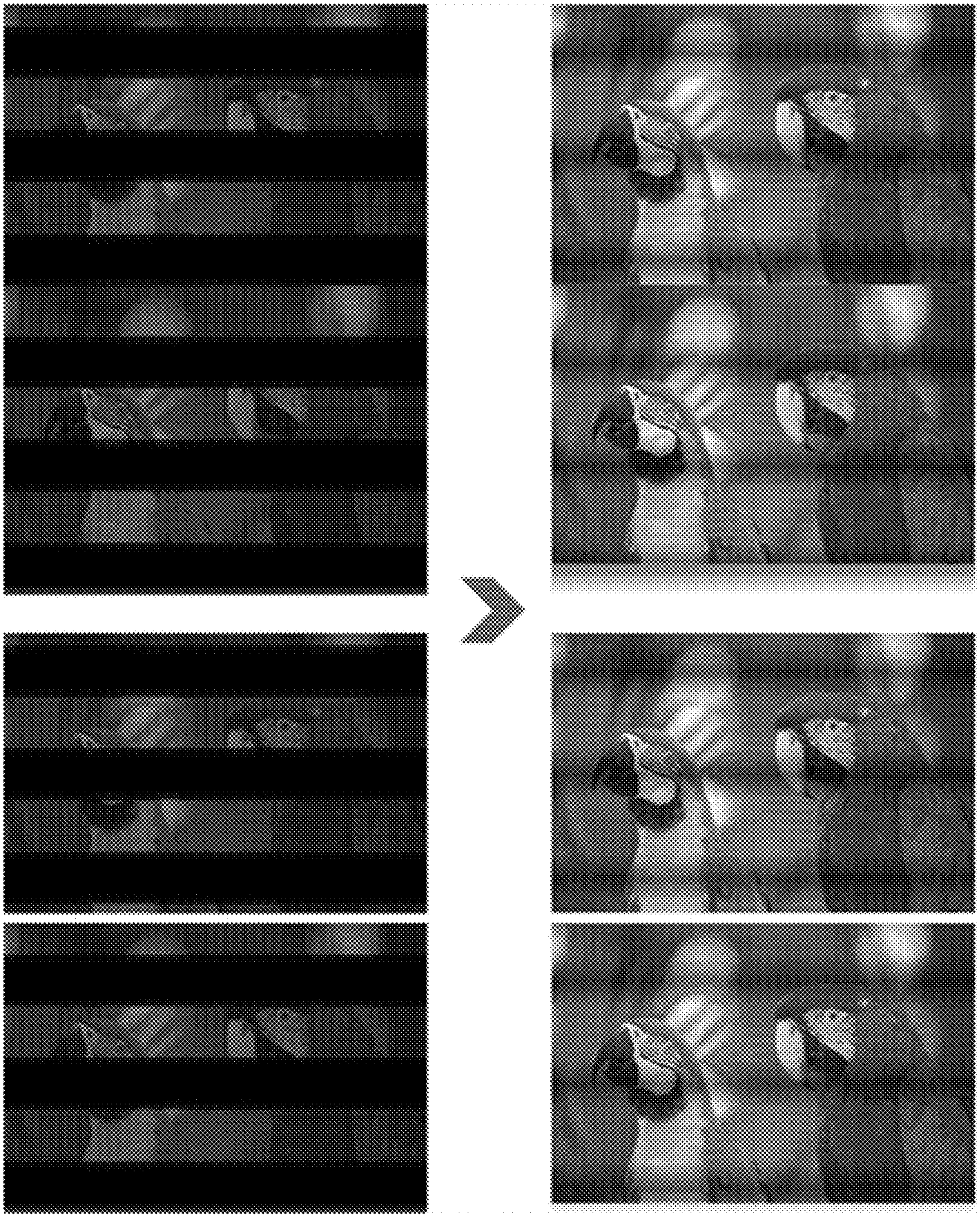
FIG. 17 depicts images resulting from adjusting sensor gain and integration time in accordance with the method of FIG. 15.

Continuing the method, the system may perform adjustment of analog gain and integration to minimize optical blacks and overflow, and to maximize dynamic range of the footage (e.g., the frames). The system may perform the step at runtime. However, in the illustrative embodiment, coarse adjustment may be performed with known background. In performing the adjustment operations, the system increases the exposure of the image sensor 240, 242 until no optical black is observed. Further, the system may adjust the analog gain of the image sensor 240, 242 within a predefined range (e.g., 10% to 40%) until a dynamic range of greater than 50% is achieved for the scene. Results 1700 of the adjustment to image sensor gain and integration time are shown in FIG. 17.

The system may implement the above as a series of operations encoded as instructions executable by a processor or controller, or, in some embodiments, with reconfigurable circuitry, such as FPGA, microcontroller, CPU, GPU, ASIC, or a combination thereof. The system may perform an initial "sweet spot" derivation based on overall lighting conditions, and to account for dynamic adjustment to allow for motion of the image capture device 130 (e.g., when worn as a wearable device). The system may start at the highest available analog gain setting (e.g., 40%) with a minimum integration period, which may be derived experimentally. While the goal of the step is not to optimize the footage (e.g., images produced by the images sensor 240, 242) for an image integration integer period (IIIP), if the IIIP is reached or exceeded, the system may determine that the setting is in the optimal range to stop further adjustments. In instances in which the lighting conditions are sufficient to analyze the band behavior from setting integration period to one line time, the system may skip ahead by setting the new integration period to the number of lines between two transitions to near-OB lines and adjust gain accordingly. The system may then proceed with repeated increases in the integration time (also referred to as integration period value) until no near-OB are present above a defined threshold ($T_{low}$). The system may then decrease the analog gain until no saturated pixels are present above a defined threshold ($T_{high}$). The system may do so to optimize for the maximize integration time (MIT) and, correspondingly, the available dynamic range.

The system may perform a gain signal to noise (SNR) test as follows. In order to minimize degradation of image quality while employing sensor analog gain, the system may utilize a quantitative test to analyze the effect of gain values on signal to noise in scenarios in which exposure values cannot be significantly adjusted. Such scenarios may include working environments with minimal illumination intensity, while pulse-width modulation mitigation must be employed at a relatively low target frequency of less than 200 Hz. The following criteria may apply for analog gain. For gain values below 25% (3.76×), negligible degradation may result, with no noticeable hot pixels. For gain values between 26% to 40% (3.84× to 6.40×), minimal degradation may result, with hot pixels slightly noticeable towards the upper bound of the range. For gain values above 45%, grainy artifacts may begin to appear. Further, hot pixels may begin to appear, particularly in a non-binning mode. Gain values above 60% are not acceptable due to the high level of noise that begins to show in higher magnifications, which combined with digital zoom, substantially degrade the resulting image quality. A gain lookup table 1800 that may be utilized in at least some embodiments of the system (e.g., the image capture device 130) is represented in FIG. 18.

Figure 19:
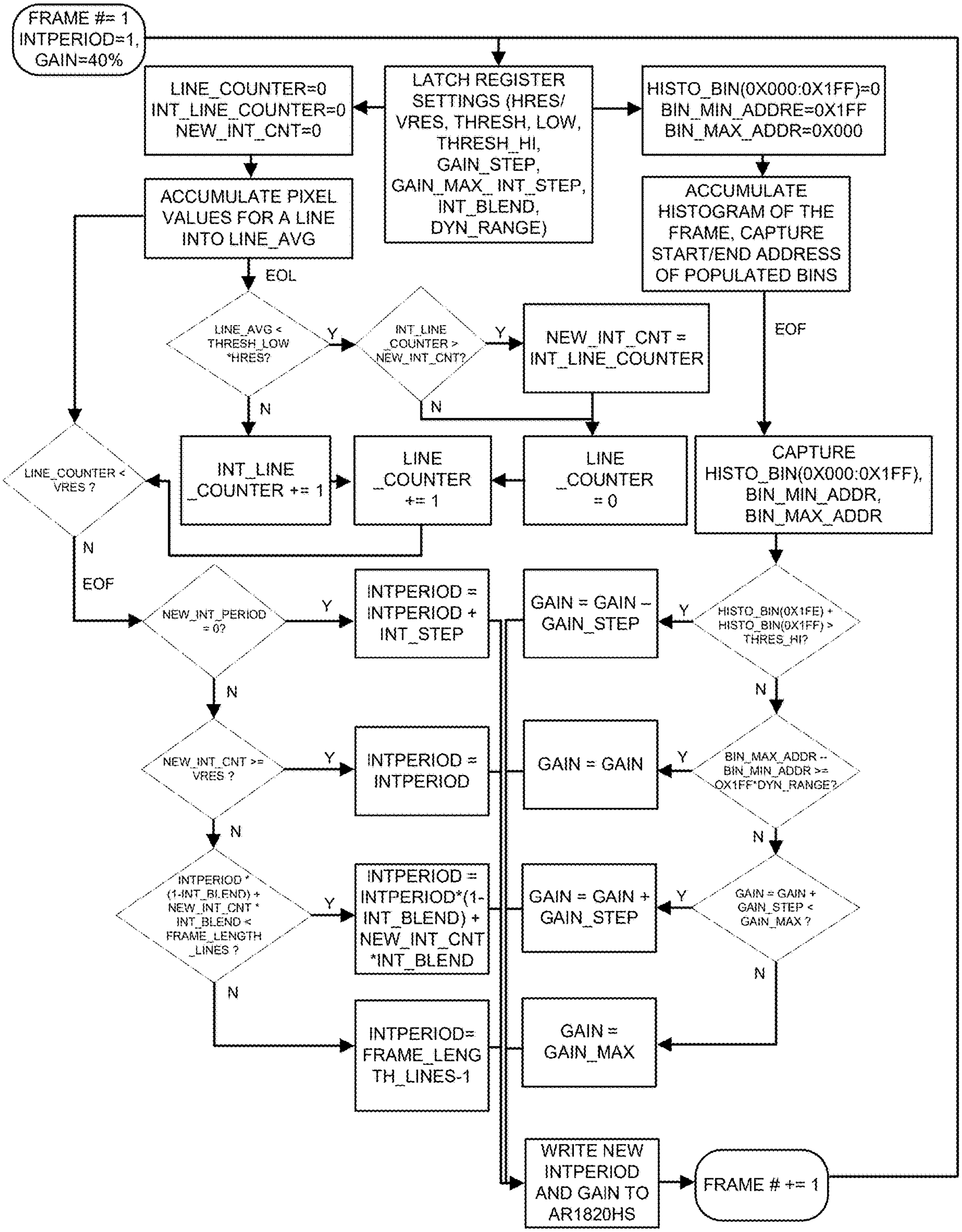
FIG. 19 is a flowchart of a method for per-line gain or offset adjustment that may be performed by the image capture device.
Figure 20:
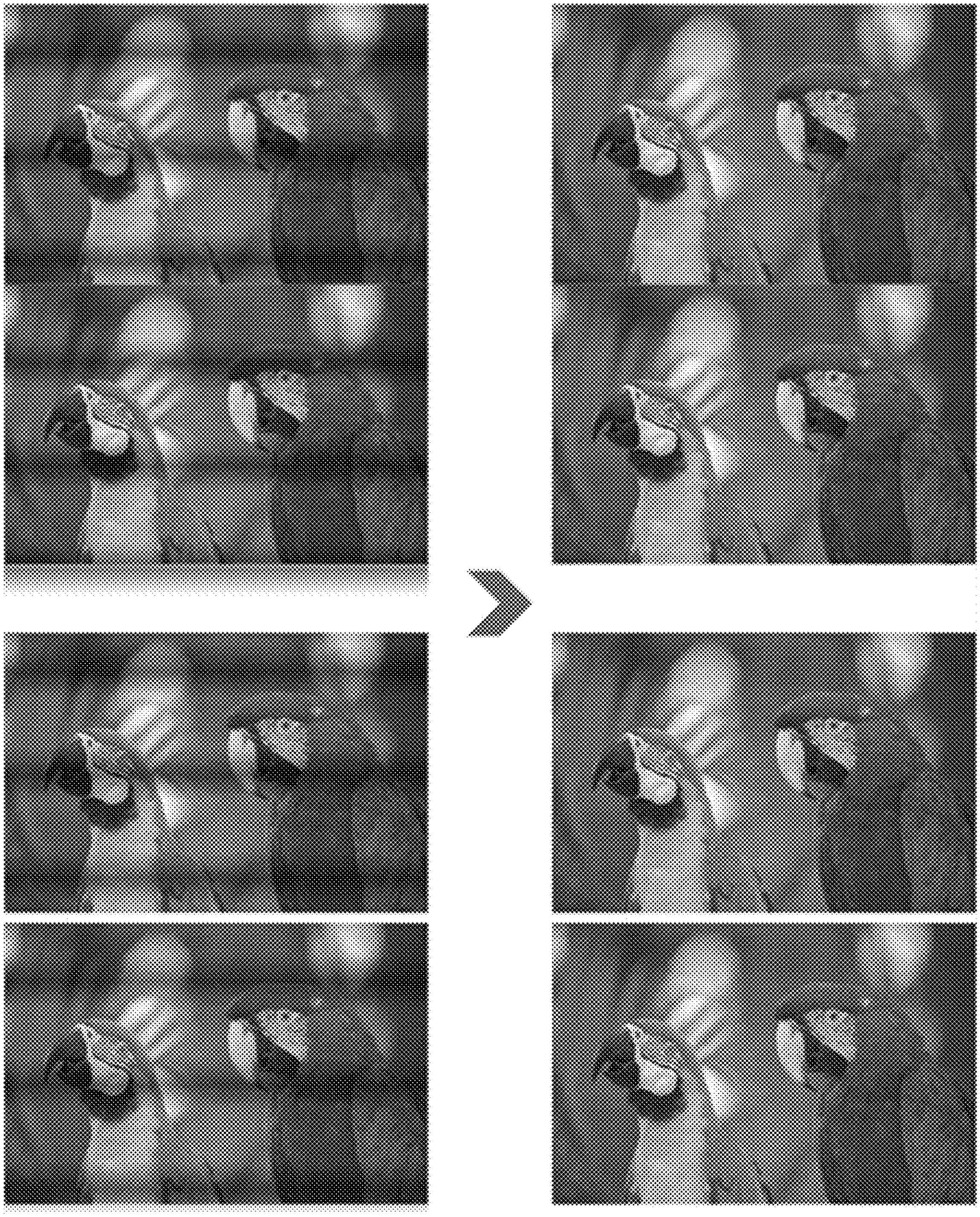
FIG. 20 depicts images resulting from performing per-line adjustments.

In executing dynamic adjustment, the system may perform the same adjustments as in the initial procedure described above. The system may additionally perform an analog gain recovery stage, in the even that the dynamic range falls below a defined value designated as acceptable. The system may perform the per-line gain/offset adjustment operations in accordance with the flowchart 1900 of FIG. 19. In doing so, the system may reuse much of the data collected in the prior operations (e.g., frame rate adjustment and adjustment of analog gain and integration time). Further, in doing so, the system may ensure that the maximum possible portion of a frame is out of optical black range to the maximum possible level. Example results 2000 of the operations, over a set of four frames, are represented in FIG. 20.

The embodiments described herein may provide per-frame exposure adjustment that enables a system, such as at the image capture device 130 to minimize the amount of frame with low-information/optical black lines present, due to the ability to analyzed the required minimum exposure dynamically, as described above. Further, the embodiments may provide improved image quality to enable the optimized per-line gain/offset adjustment operations associated with the flowchart 1900 to be performed effectively. The initial operation of frame rate adjustment may be a primary contributor as doing so compensates for an inability to guarantee that static/slow-drifting exposure bands will have full-light exposure for the defined frame sequence window. Additionally, the embodiments may provide a significant improvement in responsive of an automatic gain control application.

A notable benefit is a shorter feedback loop for sensor footage-to-gain/integration time modification. In at least some embodiments, the operations eliminate a need to perform as many operations (e.g., on every frame), and instead enable controlling thresholds and transition steps for gain/integration time manipulation. A result is that the system may deterministically apply gain/exposure configuration during interframe periods and benefit from an effective automatic gain control (AGC) refresh latency of one frame. Embodiments may also eliminate a need for additional light sensors to be present in the system, thereby freeing up I/O pins on available circuitry. Further, certain embodiments also allow more pins to be available for an active neutral density filter (e.g., the tunable component 270), if needed.

In at least some embodiments, the system (e.g., the image capture device 130) may determine a set of acceptable bounds of frame rate variability in association with the first step of adjusting the frame rate. Further, the system (e.g., the image capture device 130) may perform synchronization operations to synchronize frame rates for the left and right image sensors 240, 242.

Example methods that may be performed by the system (e.g., the image capture device 130) are described herein. In one aspect, parameters of the pulsed light illumination in the environment, such as the parameters of the pulsed light illumination provided by the surgical light, can be sensed by the image capture device 130. In one example, the sensing is based on one or a plurality of images captured by an image sensor (e.g., an image sensor 240, 242). It should be appreciated that the image capture device 130 may comprise only one image sensor 240, without a second image sensor 242.

In another example, the sensing is based on one or a plurality of videos captured by an image sensor (e.g., an image sensor 240, 242). The controller 230 may be a FPGA, CPU, GPU, microcontroller, ASIC, an analog circuitry or a combination thereof. In one aspect, the image sensor data is processed by the controller 230 to sense the parameters of the of the pulsed light illumination. In yet another example, the sensing is based on additional sensors, such as light sensor (e.g., a light sensor 280). In one aspect, the light sensor (e.g., light sensor 280) may be a photodiode, a photoresistor, a photoreceptor, a phototransistor, or any other device or devices capable of sensing light. In one example, the light sensor data is processed by the controller 230 to sense the parameters of the of the pulsed light illumination.

Referring now to FIG. 21, the system (e.g., the image capture device 130) may perform a method 2100 for reducing visual artifacts when imaging under pulse-width modulated illumination. In block 2102, the system senses parameters of the pulsed light illumination, such as light emitted by the pulse-width modulated light source(s) 140, 142). Further, in block 2104, the system generates a configuration for the image sensor 240, 242 based on the parameters of the pulsed light illumination in the environment. Additionally, the system captures an image using an image sensor 240, 242 and a lens 260, 262 under the previously generated configuration for the image sensor 240, 242, as indicated in block 2106. Further, the system sends the image to a controller or a computer (e.g., the controller 230), as indicated in block 2108, such as for image processing operations. Additionally, the system displays the processed image to the user (e.g., a surgeon), as indicated in block 2110. It should be appreciated that the image capture device 130 may comprise only one image sensor 240, without a second image sensor 242. It should be appreciated that the image capture device 130 may comprise only one lens 260, without a second lens 262.

Figure 22:
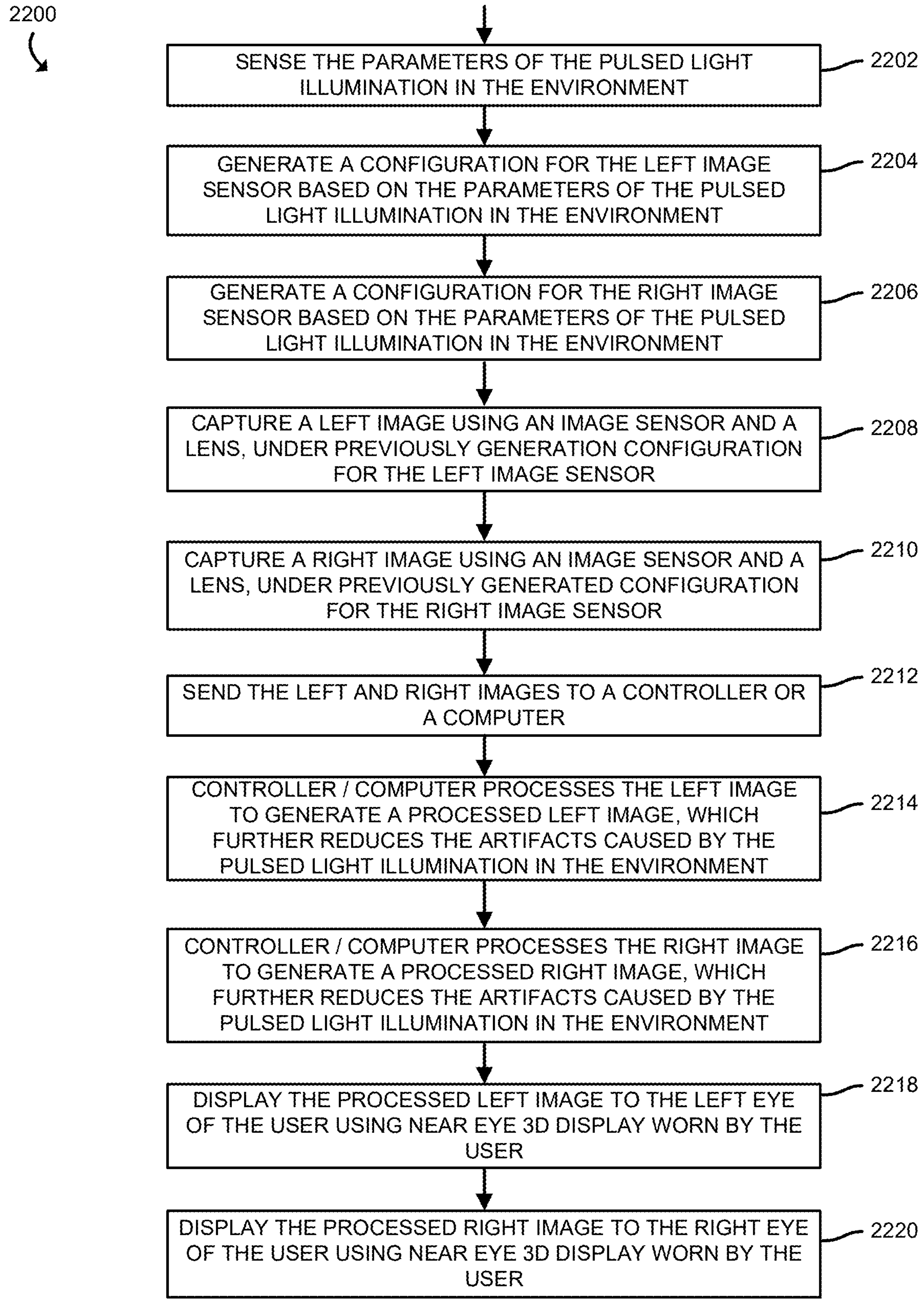

In some embodiments, the image capture device 130 includes a pair of image sensors and performs stereoscopic imaging. The image capture device 130 may display the resulting stereoscopic images to a user wearing a near-eye 3D display (e.g., the near-eye 3D display 220), which, in some embodiments, may be a pair of microdisplays. Accordingly, in some embodiments, the image capture device 130 may perform the method 2200 shown in FIG. 22. In the method 2200, the system (e.g., the image capture device 130) sense the parameters of the pulsed light illumination in the environment in block 2202. Further, the system generates a configuration for the left image sensor 240 based on the parameters of the pulsed light illumination in the environment, in block 2204. Additionally, in block 2206, the system generates a configuration for the right image sensor 242 based on the parameters of the pulsed light illumination in the environment. Continuing the method 2200, in block 2208, the system may capture a left image using an image sensor 240 and a lens 260, under the previously generated configuration for the left image sensor 240 (e.g., from block 2204). Further, in block 2210, the system may capture a right image using an image sensor 242 and a lens 262, under the previously generated configuration for the right image sensor 242 (e.g., from block 2206).

The method 2200 continues in block 2212 in which the system sends the left and right images to a controller or a computer (e.g., the controller 230). Further, the controller or computer (e.g., the controller 230) processes the left image to generate a processed left image, which further reduces the artifacts caused by the pulsed light illumination in the environment, as indicated in block 2214. Additionally, the controller or computer (e.g., the controller 230) processes the right image to generate a processed right image, which further reduces the artifacts in the right image that were caused by the pulsed light illumination in the environment, as indicated in block 2216. Continuing the method 2200, the system displays the processed left image to the left eye of the user using a near-eye 3D display 220 that is worn by the user, in block 2218. Similarly, in block 2220, the system displays the processed right image to the right eye of the user using the near-eye 3D display 220 worn by the user.

Figure 24:
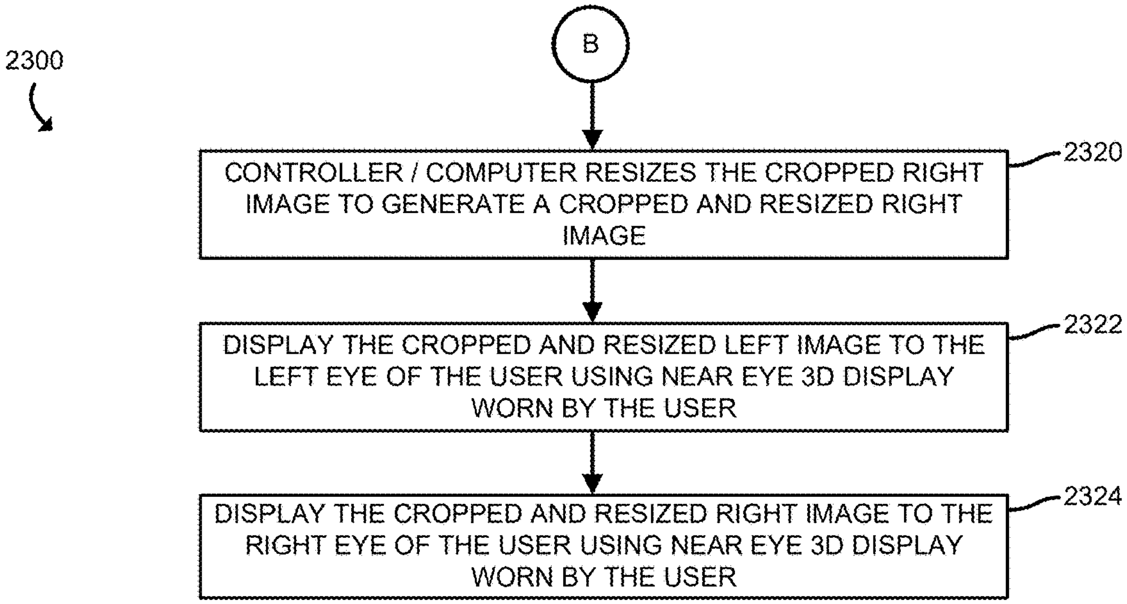

In some embodiments, the system (e.g., the image capture device 130) performs digital magnification as well. As described above, in the illustrative embodiment, the system utilizes a rolling shutter rather than a global shutter, which enables a higher pixel density and digital magnification (also referred to as digital zoom). In performing digital magnification, the system ensures binocular vertical alignment. In one embodiment, the left image sensor 240 captures a left image and the controller 230 crops the captured left image. Similarly, the right image sensor 242 captures a right image and the controller 230 crops the right image. In cropping the left and right images, the system preserves vertical alignment. That is, in cropping the left and right images, the system aligns the vertical coordinates of the left and right images. A more detailed method 2300 that may be performed by embodiments of the system (e.g., the image capture device 130) is shown in FIGS. 23-24.

In block 2302, the system senses the parameters of the pulsed light illumination in the environment. Further, in block 2304, the system generates a configuration for the left image sensor 240 based on the parameters of the pulsed light illumination in the environment. The system additionally generates a configuration for the left image sensor 240 based on the parameters of the pulsed light illumination in the environment, as indicated in block 2304. Further, the system generates a configuration for the right image sensor 242 based on the parameters of the pulsed light illumination in the environment, in block 2306. Continuing the method 2300, in block 2308, the system captures a left image using an image sensor 240 and lens 260 under the previously generated configuration for the left image sensor 240. Further, in block 2310, the system captures a right image using an image sensor 242 and a lens 262 under the previously generated configuration for the right image sensor 242.

In block 2312, the system sends the left and right images to a controller or a computer (e.g., the controller 230). In block 2314, the controller 230 crops the left image to generate a cropped left image. Similarly, in block 2316, the controller 230 crops the right image to generate a cropped right image. In doing so, the controller 230 preserves the vertical alignment of the cropped right image with respect to the cropped left image. Further, in block 2318, the controller 230 resizes the cropped left image to generated a cropped and resized left image. Continuing the method 2300 in block 2320 of FIG. 24, the controller 230 resizes the cropped right image to generate a cropped and resided right image. Further, in block 2322, the system displays the cropped and resized left image to the left eye of the user using the near-eye 3D display 220 that is worn by the user. Similarly, in block 2324, the system displays the cropped and resized right image to the right eye of the user using the near-eye 3D display 220 worn by the user.

In some embodiments, the system (e.g., the image capture device 130) processes the left and right images prior to cropping them. A representative flowchart of such a method 2500 is shown in FIG. 25. In block 2502, the system senses the parameters of the pulsed light illumination in the environment. Further, in block 2504, the system generates a configuration for the left image sensor 240 based on the parameters of the pulsed light illumination in the environment. Additionally, in block 2506, the system generates a configuration for the right image sensor 242 based on the parameters of the pulsed light illumination in the environment. Further, in block 2508, the system captures a left image using an image sensor 240 and a lens 260, under the previously generated configuration for the left image sensor 240. Additionally, in block 2510, the system captures a right image using an image sensor 242 and a lens 262 under the previously generated configuration for the right image sensor 242. Further, in block 2512, the system sends the left and right images to a controller or a computer (e.g., the controller 230). Additionally, the controller 230 processes the left image to generate a processed left image, which further reduces the artifacts caused by the pulsed light illumination in the environment, as indicated in block 2514. Further, the controller 230 processes the right image to generate a processed right image, which further reduces the artifacts in the right image caused by the pulsed light illumination in the environment, in block 2516. The controller 230 crops the processed left image to generate a cropped left image in block 2518. Continuing the method 2500 in block 2520 of FIG. 26, the controller 230 crops the processed right image to generate a cropped right image. In doing so, the controller 230 preserves the vertical alignment of the cropped right image with respect to the cropped left image.

Continuing the method 2500, the controller 230 resizes the cropped left image to generate a cropped and resized left image, in block 2522. Additionally, the controller 230 resizes the cropped right image to generate a cropped and resized right image, in block 2524. Further, the system displays the cropped and resized left image to the left eye of the user using the near-eye 3D display 220 worn by the user, in block 2526. Additionally, the system displays the cropped and resized right image to the right eye of the user using the near-eye 3D display 220 worn by the user, in block 2528.

In some embodiments, the system (e.g., apparatus) comprises at least one image sensor, at least one lens, and at least one controller or computer. It may further comprise a mechanical mount to mount the apparatus to a surgical light. In one aspect, the apparatus may be co-axial with the center axis of the surgical light. In another aspect, the apparatus may not be co-axial with the center axis of the surgical light. In another aspect, the system (e.g., apparatus) further comprises at least one surgical robot.

In some embodiments, only one image sensor 240 is used to enable 2D imaging. In another embodiment, two image sensors 240, 242 are used to enable stereoscopic imaging. In yet another embodiment, the apparatus comprises a near-eye 3D display 220, an eyeglass frame 210 or head mount for wearing, at least one image sensor 240, 242 that is worn, at least one lens 260, 262 to be used with the image sensor 240, 242 and said lens 260, 262 is worn by the user, and a controller 230. FIG. 2, discussed above, illustrates at least one embodiment of the system architecture, and FIG. 3, also discussed above, illustrate one possible physical embodiment of the apparatus (e.g., the image capture device 130). It should be appreciated that the wearable frame 210 can be in the form of a head mount, in lieu of an eyeglass frame. It should be appreciated that the controller 230 can be a microcontroller, a computer, a CPU, a GPU, a FPGA, an ASIC, an analog circuitry, or a combination thereof. The apparatus embodied in FIGS. 2 and 3 can enable the aforementioned methods to minimize the artifacts caused by the illumination using pulse-width modulation.

It should be appreciated that the controller 230 may be operatively coupled to the image sensors 240 and 242. The controller 230 may interact with the image sensors via either wired or wireless communication.

In some embodiments, the system (e.g., the image capture device 130) further comprises transparent plastic or glass 330, 332, surrounding the left near-eye display 320 and right near-eye display 322. In one example, the apparatus uses a compact offset configuration, whereby only center part of area before each eye is non-transparent and peripheral parts are transparent. This way, the surgeon/dentist can see around the near-eye digital display to look at the patient with unhindered natural vision (similar to a conventional surgical loupe). In one embodiment, the apparatus further comprises prescription eyeglasses, so that nearsightedness, farsightedness, and astigmatism can be corrected. In some embodiments, the system has an optical see-through configuration 400, as shown in FIG. 4. In at least some embodiments, both near-eye displays 420, 422 are transparent or semi-transparent.

In some embodiment, the image sensors 240, 242 are a pair of color image sensors. Thus, the apparatus (e.g., the image capture device 130) can digitally image/magnify stereoscopic color images, and display the color images to a user in the near-eye display 220 in 3D. In one example, the left and right lenses 260, 262 have fixed focal lengths. In another example, the left and right lenses 260, 262 are zoom lenses with variable focal lengths.

In some embodiments, the image capture device 130 may enable color image magnification in 3D, despite the use of lenses with fixed focal length (no zoom lenses used). In some embodiments, the image capture device 130 may enable color image magnification in 3D and use lenses with variable focal length (i.e. zoom lenses). It should be appreciated that optical zoom, digital zoom or a combination of optical and digital zoom may be used.

In another example, the color image sensors are complementary metal-oxide-semiconductor (CMOS) image sensors. In yet another example, the color image sensors are charge-coupled device (CCD) image sensors. It should be appreciated that the CMOS image sensor may have a global shutter, a rolling shutter, or a combination thereof.

It should be appreciated that the near-eye 3D display 220 may comprise LCD (liquid crystal) microdisplays, LED (light emitting diode) microdisplays, organic LED (OLED) microdisplays, liquid crystal on silicon (LCOS) microdisplays, retinal scanning displays, waveguide-based microdisplays, virtual retinal displays, optical see through displays, video see through displays, convertible video-optical see through displays, wearable projection displays, and the like.

In another example, the apparatus (e.g., the image capture device 130) further comprises a light source for surgical field illumination. In one example, the light source is based on one or a plurality of light emitting diodes (LED). In another example, the light source is based on one or a plurality of laser diodes with a waveguide or optical fiber. In another example, the light source has a diffuser.

In another example, the apparatus further comprises one of a plurality of neutral density filters. In one aspect, the neutral density filter can be moved in or out of the optical pathway of at least one image sensor 240, 242. In one example, the apparatus comprises a liquid crystal tunable filter 270 which serves as a neutral density filter. It should be appreciated that the attenuation of the liquid crystal tunable filter may be tuned by changing the voltage or current applied to the said liquid crystal tunable filter. In another example, the apparatus comprises a pair of polarizers 270 which serves as a neutral density filter. It should be appreciated that the attenuation of the pair of polarizers may be tuned by rotating at least one of the polarizers.

In some embodiments, the apparatus further comprises one or more additional sensors, such as an inertial measurement unit (IMU), accelerometers, gyroscopes, magnetometers, proximity sensors, microphone, force sensors, ambient light sensors, etc. In yet another embodiment, the apparatus further comprises tracking hardware, such as optical tracking hardware, electromagnetic tracking hardware, etc. In some embodiments, the apparatus further comprises communication hardware, to enable wireless or wired communication such as such as Wi-Fi, Bluetooth, cellular communication, Ethernet, LAN, Bluetooth. The apparatus can thus stream the magnification data and/or the original image data captured by the image sensors to another apparatus, computer or mobile devices. In some embodiments, the lenses in the apparatus are autofocus lenses. In other embodiments the lenses in the apparatus are autofocus lenses but the apparatus will focus the lenses, on request of the user. In one example, the focus setting of the left lens and right lens are always the same.

In some embodiments, the apparatus further comprises additional input devices, such as a foot pedal, a hand controller, one or more buttons, a touch screen, microphone with voice control, gesture control device such as Microsoft Kinect, etc. In some embodiments, the apparatus can display medical images such as MRI (magnetic resonance image) image data, computed tomography (CT) image data, positron emission tomography (PET) image data, single-photon emission computed tomography (SPECT), PET/CT, SPECT/CT, PET/MRI, gamma scintigraphy, X-ray radiography, ultrasound, and the like. Further, in some embodiments, the apparatus further comprises digital storage hardware, to enable recording the image data, and/or the original image data from image sensors, and/or audio data, and/or other sensor data.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail may be made without departing from the spirt and scope of the present disclosure. Thus the present disclosure should not be limited by any of the above-described exemplary embodiments, but should be defined only in accordance with the following claims and their equivalents.

What is claimed is:

1. A system for reducing artifacts when imaging under pulse-width modulated illumination, comprising:

an image sensor;

a controller operatively coupled to the image sensor and configured to:

capture, with the image sensor, images as frames of a video of a target in an environment in which the target is illuminated by a pulse-width modulated light source, including setting a first parameter for the image sensor as a function of a light pulsation period of the pulse-width modulated light source to reduce artifacts in the images associated with the pulse-width modulation of the light source;

determine whether residual banding artifacts resulting from the pulse-width modulation of the light source are unacceptable in the images captured with the image sensor configured to utilize the first parameter that was set by the controller as a function of the light pulsation period of the pulse-width modulated light source;

perform, in response to a determination that residual banding artifacts are unacceptable in the images, image processing to correct the residual banding; and output the resulting images with reduced artifacts for viewing by a user.

2. The system of claim 1, wherein the first parameter is integration time of the image sensor.

3. The system of claim 1, wherein the image processing to correct the residual banding comprises determining a relative brightness for each row of each image, determining a maximum brightness for each image, and multiplying each row of each image by a ratio of the maximum brightness for the corresponding image to the relative brightness of the corresponding row.

4. The system of claim 3, wherein the controller is further configured to:

utilize one or more brightness ratios determined from one or more previous images when performing image processing to correct the residual banding in place of calculating brightness ratios for a current image to provide an increase in computational efficiency in the performance of the image processing.

5. The system of claim 1, wherein the controller is further configured to:

set an integration time for the image sensor as an integer multiple of the light pulsation period of the light source in the environment; and dynamically adjust the integration time as a function of whether residual banding is unacceptable in images produced using a previous parameter for the integration time for the image sensor.

6. The system of claim 1, further comprising:

a tunable component to control an amount of light directed to the image sensor; and wherein the controller is connected to the tunable component and is further configured to:

adjust the tunable component to increase a dynamic range associated with the images to a target dynamic range when capturing the images with the image sensor.

7. The system of claim 6, wherein the tunable component comprises a motor-driven mechanical iris and the controller is further configured to:

adjust an aperture of the motor-driven mechanical iris to control the amount of light directed to the image sensor to increase the dynamic range.

8. The system of claim 6, wherein the tunable component comprises a cross polarizer component having a set of multiple linear polarizers arranged in series, and the controller is further configured to:

rotate a first linear polarizer of the set relative to a second linear polarizer of the set to adjust an attenuation of light passing through the tunable cross polarizer component.

9. The system of claim 6, wherein the tunable component comprises a voltage-controlled liquid crystal filter positioned in a path of the light to the image sensor and the controller is further configured to:

control a voltage applied to the liquid crystal filter to control an amount of light directed to the image sensor.

10. The system of claim 1, wherein the system further comprises:

a set of multiple light sensors, wherein each light sensor is configured to sample, at a rate that is equal to a line rate of the image sensor, a corresponding illumination for a corresponding pulse-width modulated light source in a set of multiple pulse-width modulated light sources that produce light that combines to produce a resulting color temperature; and the controller is further configured to:

determine the relative brightness for each row of an image utilizing illumination data from each of the light sensors, including performing box car averaging for each row associated with the image to determine the relative brightness for the corresponding row.

11. The system of claim 1, wherein the image sensor is a first image sensor and the images are first images, and the system further comprises:

a second image sensor operatively coupled to the controller; and the controller is further configured to:

capture, concurrently with the first images and with the second image sensor, second images as frames of the video of the target in an environment;

determine whether residual banding resulting from the pulse-width modulation of the light source is unacceptable in the second images;

perform, in response to a determination that residual banding is unacceptable in the second images, image processing to correct the residual banding; and output the second images with reduced artifacts for viewing by the user.

12. The system of claim 11, further comprising:

a near-eye three dimensional display;

an eyeglass frame that houses the controller, the first image sensor, and the second image sensor, and the near-eye three dimensional display;

wherein the first image sensor comprises a first rolling shutter;

wherein the second image sensor comprises a second rolling shutter;

wherein the controller is further configured to:

output the first images to a left eye of a user with the near-eye three dimensional display; and concurrently output the second images to a right eye of the user with the near-eye three dimensional display to provide a stereoscopic video of the target to the user.

13. A method for reducing artifacts when imaging under pulse-width modulated illumination, comprising:

capturing, with an image sensor, images as frames of a video of a target in an environment in which the target is illuminated by a pulse-width modulated light source, including setting a first parameter for the image sensor as a function of a light pulsation period of the pulse-width modulated light source to reduce artifacts in the images associated with the pulse-width modulation of the light source;

determining whether residual banding artifacts resulting from the pulse-width modulation of the light source are unacceptable in the images captured with the image sensor configured to utilize the first parameter that was set by the controller as a function of the light pulsation period of the pulse-width modulated light source;

performing, in response to a determination that residual banding artifacts are unacceptable in the images, image processing to correct the residual banding; and outputting the resulting images with reduced artifacts for viewing by a user.

14. The method of claim 13, wherein the first parameter is integration time of the image sensor.

15. The method of claim 13, wherein the image processing to correct the residual banding comprises determining a relative brightness for each row of each image, determining a maximum brightness for each image, and multiplying each row of each image by a ratio of the maximum brightness for the corresponding image to the relative brightness of the corresponding row.

16. The method of claim 15, further comprising:

utilizing one or more brightness ratios determined from one or more previous images when performing image processing to correct the residual banding in place of calculating brightness ratios for a current image to provide an increase in computational efficiency in the performance of the image processing.

17. The method of claim 13, further comprising:

setting an integration time for the image sensor as an integer multiple of the light pulsation period of the light source in the environment; and dynamically adjusting the integration time as a function of whether residual banding is unacceptable in images produced using a previous setting for the integration time for the image sensor.

18. The method of claim 13, further comprising:

adjusting, with a controller connected to a tunable component adapted to control an amount of light directed to the image sensor, the tunable component to increase a dynamic range associated with the images to a target dynamic range when capturing the images with the image sensor.

19. The method of claim 18, wherein adjusting the tunable component comprises:

adjusting, with the controller, an aperture of a motor-driven mechanical iris connected to the controller, to control the amount of light directed to the image sensor to increase the dynamic range.

20. The method of claim 18, wherein adjusting the tunable component comprises:

rotating, in a cross polarizer component, a first linear polarizer of a set of linear polarizers arranged in series relative to a second linear polarizer of the set to adjust an attenuation of light passing through the tunable cross polarizer component.

21. The method of claim 18, wherein adjusting the tunable component comprises:

controlling a voltage applied to a voltage-controlled liquid crystal filter positioned in a path of the light to the image sensor to control an amount of light directed to the image sensor.

22. The method of claim 13, further comprising:

sampling, with a set of multiple light sensors and at a rate that is equal to a line rate of the image sensor, a corresponding illumination for a corresponding pulse-width modulated light source in a set of multiple pulse-width modulated light sources that produce light that combines to produce a resulting color temperature; and determining the relative brightness for each row of an image utilizing illumination data from each of the light sensors, including performing box car averaging for each row associated with the image to determine the relative brightness for the corresponding row.

23. The method of claim 13, wherein the images are first images, the method further comprising:

capturing, concurrently with the first images and with a second image sensor, second images as frames of the video of the target in an environment;

determining whether residual banding resulting from the pulse-width modulation of the light source is unacceptable in the second images;

performing, in response to a determination that residual banding is unacceptable in the second images, image processing to correct the residual banding; and outputting the second images with reduced artifacts for viewing by the user.

24. The method of claim 23, wherein capturing the first and second images comprises capturing the first and second images with rolling shutters;

the method further comprising:

outputting the first images to a left eye of a user with a near-eye three dimensional display; and concurrently outputting the second images to a right eye of the user with the near-eye three dimensional display to provide a stereoscopic video of the target to the user.

25. A system for reducing artifacts when imaging under pulsed light illumination, comprising:

a first image sensor;

a second image sensor;

a controller operatively coupled to the first image sensor and the second image sensor, and configured to:

sense a first parameter of pulsed light illumination in an environment;

generate a first configuration for the first image sensor based on the first parameter of the pulsed light illumination in the environment;

capture a first image using the first image sensor and a first lens, under the first configuration for the first image sensor;

generate a second configuration for the second image sensor based on the first parameter of the pulsed light illumination in the environment;

capture a second image using the second image sensor, under the second configuration for the second image sensor; and display a processed image to a user, wherein the processed image comprises the first image and the second image.

26. The system of claim 25, wherein the processed image comprises a first cropped image and a second cropped image, and the controller is further configured to:

crop the first image to generate a cropped first image; and crop the second image to generate a cropped second image and preserve a vertical alignment of the cropped second image with respect to a cropped first image.

27. A method for reducing artifacts when imaging under pulsed light illumination, comprising:

sensing a first parameter of pulsed light illumination in an environment;

generating a first configuration for a first image sensor based on the first parameter of the pulsed light illumination in the environment;

capturing a first image using the first image sensor and a first lens, under the first configuration for the first image sensor;

generating a second configuration for a second image sensor based on the first parameter of the pulsed light illumination in the environment;

capturing a second image using the second image sensor, under the second configuration for the second image sensor; and displaying a processed image to a user, wherein the processed image comprises the first image and the second image.

* * * * *